US012542982B2

(12) United States Patent
Saito

(10) Patent No.: US 12,542,982 B2
(45) Date of Patent: Feb. 3, 2026

(54) IMAGING APPARATUS, ELECTRONIC DEVICE, AND SIGNAL PROCESSING METHOD

(71) Applicant: SONY SEMICONDUCTOR SOLUTIONS CORPORATION, Kanagawa (JP)

(72) Inventor: Daisuke Saito, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 82 days.

(21) Appl. No.: 18/554,043

(22) PCT Filed: Feb. 22, 2022

(86) PCT No.: PCT/JP2022/007073
§ 371 (c)(1),
(2) Date: Oct. 5, 2023

(87) PCT Pub. No.: WO2022/219928
PCT Pub. Date: Oct. 20, 2022

(65) Prior Publication Data
US 2024/0121532 A1 Apr. 11, 2024

(30) Foreign Application Priority Data
Apr. 16, 2021 (JP) .................. 2021-069851

(51) Int. Cl.
*H04N 25/77* (2023.01)
*G06N 3/0464* (2023.01)
(Continued)

(52) U.S. Cl.
CPC ............. *H04N 25/77* (2023.01); *H04N 25/10* (2023.01)

(58) Field of Classification Search
CPC ........ H04N 25/10; H04N 25/77; H04N 15/46; H04N 25/79; H04N 25/46; G06N 3/0464;
(Continued)

(56) References Cited

U.S. PATENT DOCUMENTS 11,907,832 B2 * 2/2024 Shen ...................... G06N 3/094
12,373,366 B2 * 7/2025 Chen ................... G06F 13/4022
(Continued)

FOREIGN PATENT DOCUMENTS

JP   H03204624 A   9/1991
JP   2020-113809   7/2020
(Continued)

OTHER PUBLICATIONS

International Search Report and Written Opinion prepared by the Japan Patent Office on Apr. 12, 2022, for International Application No. PCT/JP2022/007073, 2 pgs.

*Primary Examiner* — Marly S Camargo
(74) *Attorney, Agent, or Firm* — Sheridan Ross PC

(57) ABSTRACT

To provide an imaging apparatus which enables sophisticated calculations to be realized at lower power. An imaging apparatus according to an embodiment of the present disclosure includes: a first substrate group in which is arranged a light source cell array portion configured to generate a light signal; and a second substrate group in which is arranged a pixel array portion configured to photoelectrically convert the light signal and output a pixel signal representing a result of a sum-of-product computation. The first substrate group and the second substrate group are stacked so that at least a part of the light source cell array portion overlaps with the pixel array portion.

20 Claims, 34 Drawing Sheets

(51) Int. Cl.
  *G06N 3/063* (2023.01)
  *H04N 25/10* (2023.01)
  *H04N 25/46* (2023.01)
  *H04N 25/79* (2023.01)

(58) Field of Classification Search
  CPC .. G06N 3/063; G06N 3/0675; H10F 39/1825; H10F 39/803; H10F 39/8059; H10F 39/806; H10F 39/8057; Y02D 10/00
  See application file for complete search history.

(56) References Cited

U.S. PATENT DOCUMENTS

2004/0195572 A1* 10/2004 Kato ................ H10D 86/0214
                                                             257/72
2019/0191111 A1   6/2019 Juen et al.
2020/0250533 A1   8/2020 Shen
2022/0094842 A1*  3/2022 Fujiwara ................ H04N 25/77
2022/0291739 A1*  9/2022 Ko ....................... G06N 3/0464
2023/0188865 A1*  6/2023 Hsieh ................... H04N 19/124

FOREIGN PATENT DOCUMENTS

WO    WO 2018/037862      3/2018
WO    WO-2020145142 A1    7/2020

* cited by examiner

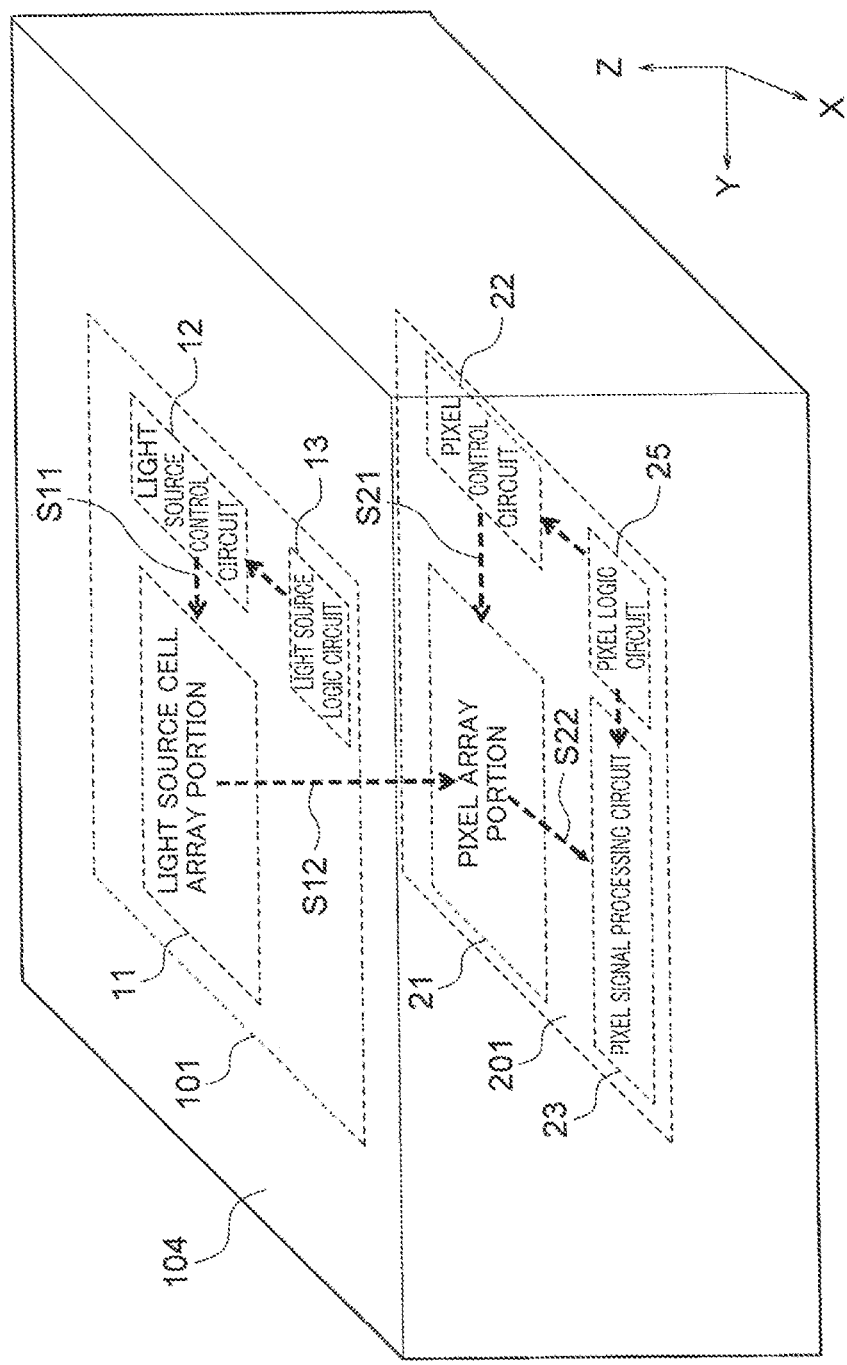

IMAGING APPARATUS, ELECTRONIC DEVICE, AND SIGNAL PROCESSING METHOD

CROSS REFERENCE TO RELATED APPLICATIONS

This application is a national stage application under 35 U.S.C. 371 and claims the benefit of PCT Application No. PCT/JP2022/007073, having an international filing date of 22 Feb. 2022, which designated the United States, which PCT application claimed the benefit of Japanese Patent Application No. 2021-069851, filed 16 Apr. 2021, the entire disclosures of each of which are incorporated herein by reference.

TECHNICAL FIELD

The present disclosure relates to an imaging apparatus, an electronic device, and a signal processing method.

BACKGROUND ART

Since a large number of memory accesses take place in a deep neural network (DNN), power efficiency declines when using a von Neumann machine (for example, a DSP (Digital Signal Processor)). In consideration thereof, CIM (Computing in memory) in which calculations are performed on a memory array that is a non-von Neumann machine is attracting attention. In addition, since recent increases in volumes of transmitted data demand sophisticated calculations, there is an increasing trend in power consumption due to computation. As a result, in a few years, a so-called saturation of the cloud in which processing capacity of the cloud runs out may occur.

CITATION LIST

Patent Literature

PTL 1: JP 2020-113809A

SUMMARY

Technical Problem

With conventional computing schemes, there is a limit to how much energy efficiency of computation can be improved. In addition, increasing expression methods of computation in order to realize sophisticated calculations increases demand for latency. As a result, the power consumption due to computation further increases.

The present disclosure provides an imaging apparatus, an electronic device, and a signal processing method which enable sophisticated calculations to be realized at lower power.

Solution to Problem

An imaging apparatus according to an embodiment of the present disclosure includes: a first substrate group in which is arranged a light source cell array portion configured to generate a light signal; and a second substrate group in which is arranged a pixel array portion configured to photoelectrically convert the light signal and output a pixel signal representing a result of a sum-of-product computation. The first substrate group and the second substrate group are stacked so that at least a part of the light source cell array portion overlaps with the pixel array portion.

The light source cell array portion may include a plurality of light source cells arranged in a two-dimensional pattern, the pixel array portion may include a plurality of pixels arranged in a two-dimensional pattern, and in the plurality of light source cells and the plurality of pixels, a center pitch of one may be an integral multiple of a center pitch of the other.

The light signal may be infrared light or visible light.

The first substrate group may include:
a light source substrate on which the light source cell array portion is arranged; and
a light source control substrate which is stacked below the light source substrate and on which a light source control circuit configured to control drive of the light source cell array portion is arranged.

The second substrate group may include:
a substrate on which the pixel array portion is arranged; and
a memory substrate which is stacked below the substrate and on which is arranged a memory cell array portion configured to output a convolution signal representing a result of a sum-of-product computation of an input signal based on the pixel signal.

At least one of the pixel signal and the convolution signal may be an analog signal.

A CIM readout circuit configured to process the convolution signal read from the memory cell array portion may be further included.

A pixel signal processing circuit configured to process the pixel signal read from the pixel array portion may be further included.

The pixel signal processing circuit may be arranged on a same substrate as the pixel array portion.

The pixel signal processing circuit may be arranged on a different substrate from the pixel array portion.

The pixel array portion may include a photoelectric conversion portion configured to
photoelectrically convert the light signal and a pixel transistor portion configured to subject the light signal to a sum-of-product computation, and
the photoelectric conversion portion may be arranged on a different substrate from the pixel transistor portion.

An optical modulation element arranged between the light source cell array portion and the pixel array portion may be further included.

A shutter arranged between the light source cell array portion and the pixel array portion may be further included.

A black mask provided on an edge of the first substrate group and an edge of the second substrate group may be further included.

The first substrate group and the second substrate group may be housed in a light-shielding package.

Each of the plurality of light source cells may include a light-emitting element, an active element configured to independently control the light-emitting element, and a storage portion provided between the light-emitting element and the active element.

The storage portion may be configured to store data related to the sum-of-product computation.

The pixel array portion may be configured to receive, in a direction opposite to the light signal, reflected light having been reflected by a subject.

An electronic device according to an embodiment of the present disclosure includes an imaging apparatus including: a first substrate group in which is arranged a light source cell array portion configured to generate a light signal; and a second substrate group in which is arranged a pixel array portion configured to photoelectrically convert the light signal and output a pixel signal representing a result of a sum-of-product computation, wherein the first substrate group and the second substrate group are stacked so that at least a part of the light source cell array portion overlaps with the pixel array portion.

A signal processing method according to an embodiment of the present disclosure includes the steps of:

generating a light signal with a light source cell array portion arranged in a first substrate group; and photoelectrically converting the light signal and outputting a pixel signal representing a result of a sum-of-product computation with a pixel array portion which overlaps with at least a part of the light source cell array portion.

BRIEF DESCRIPTION OF DRAWINGS

FIG. 2E is a diagram showing an example of a structure of the imaging apparatus according to the first embodiment.

DESCRIPTION OF EMBODIMENTS

First Embodiment

Figure 1:
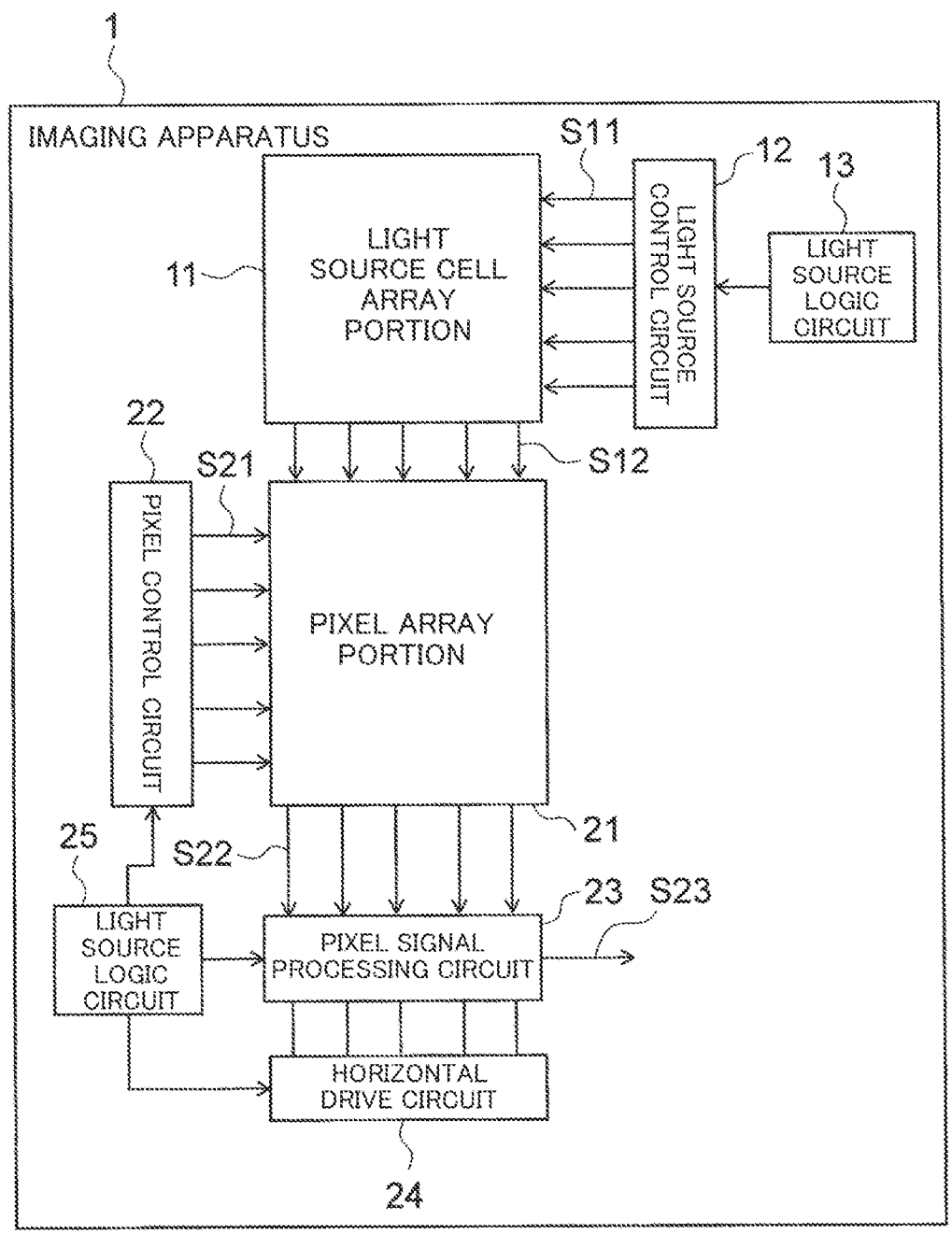
FIG. 1 is a block diagram showing a configuration of an imaging apparatus according to a first embodiment.

FIG. 1 is a block diagram showing a configuration of an imaging apparatus according to a first embodiment. The imaging apparatus 1 shown in FIG. 1 includes a light source cell array portion 11, a light source control circuit 12, a light source logic circuit 13, a pixel array portion 21, a pixel control circuit 22, a pixel signal processing circuit 23, a horizontal drive circuit 24, and a pixel logic circuit 25.

A plurality of light source cells are arranged in the light source cell array portion 11 in a two-dimensional pattern. Each light source cell emits light based on a light source control signal S11 from the light source control circuit 12. A light signal S12 is generated by the emission of light. The generated light signal S12 is received by the pixel array portion 21. A circuit configuration example of the light source cell array portion 11 will be described later.

For example, the light source control circuit 12 includes a drive circuit configured to drive the light source cell array portion 11 and a decoder configured to select a light source cell and inputs the light source control signal S11 to each light source cell of the light source cell array portion 11 via a light source drive wiring (not illustrated in FIG. 1). Due to the light source control signal S11, the light source control circuit 12 sequentially selects each light source cell in the light source cell array portion 11, causes the light source cell to emit light, and causes the light signal S12 to be emitted towards the pixel array portion 21. Note that the light source control circuit 12 may collectively cause the respective light source cells to emit light.

The light source logic circuit 13 is configured to receive a clock signal input from outside and data for commanding an operating mode or the like and to control operations of the light source cell array portion 11 as a whole. The light source logic circuit 13 may be provided with a memory circuit for storing a coefficient (load) of a sum-of-product computation.

A plurality of pixels are arranged in the pixel array portion 21 in a two-dimensional pattern. Each pixel is configured to photoelectrically convert the light signal S12 and generate a pixel signal S22 representing a result of a sum-of-product computation based on a plurality of pixel control signals S21 from the pixel control circuit 22. In addition, each pixel is configured to output the pixel signal S22 in one direction towards the pixel signal processing circuit 23. A circuit configuration example of the pixel array portion 21 will be described later.

The pixel control circuit 22 is constituted of, for example, a shift register and is configured to input the pixel control signal S21 to each pixel of the pixel array portion 21 via a pixel drive wiring (not illustrated in FIG. 1). Due to the pixel control signal S21, the pixel control circuit 22 is configured to sequentially select and scan each pixel of the pixel array portion 21 and cause the pixel signal S22 to be output to the pixel signal processing circuit 23. Note that the pixel control circuit 22 may be configured to collectively scan the respective pixels.

The pixel signal processing circuit 23 is configured to perform CDS (Correlated Double Sampling) processing and AD (Analog to Digital) conversion processing with respect to the analog-system pixel signal S22 read from the pixel array portion 21 in order to remove pixel-specific fixed pattern noise. As a result, a digital pixel signal S23 is output from the pixel signal processing circuit 23. Note that the pixel signal processing circuit 23 need not perform CDS processing.

For example, the horizontal drive circuit 24 is constituted of a shift register and sequentially outputs horizontal scanning pulses to the pixel signal processing circuit 23. Accordingly, for example, the digital pixel signals S23 stored in the pixel signal processing circuit 23 are sequentially output.

The pixel logic circuit 25 is configured to receive a clock signal input from outside and data for commanding an operating mode or the like and to control operations of the pixel array portion 21 as a whole. For example, the pixel logic circuit 25 is configured to generate a vertical synchronization signal, a horizontal synchronization signal, and the like based on the input clock signal and supply the generated signals to the pixel control circuit 22, the pixel signal processing circuit 23, and the horizontal drive circuit 24.

FIGS. 2A to 2E are diagrams showing an example of a structure of the imaging apparatus 1. In the present embodiment, the light source cell array portion 11, the light source control circuit 12, and the light source logic circuit 13 are arranged on a first substrate 101. In addition, the pixel array portion 21, the pixel control circuit 22, the pixel signal processing circuit 23, and the pixel logic circuit 25 are arranged on a second substrate 201. Note that in FIG. 2A, a description of the horizontal drive circuit 24 has been omitted from the second substrate 201 due to limitations of space. In addition, in FIGS. 2A to 2E, two directions which are parallel to the substrates and which are mutually orthogonal are respectively defined as an X direction and a Y direction. Furthermore, a direction orthogonal to the X direction and the Y direction or, in other words, a laminating direction of the substrates is defined as a Z direction.

Figure 2A:
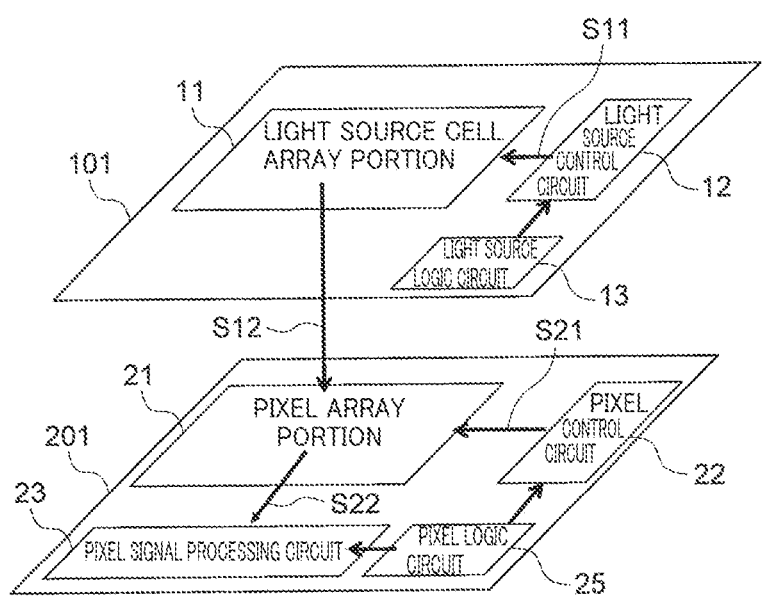
FIG. 2A is a diagram showing an example of a structure of the imaging apparatus according to the first embodiment.
Figure 2A:
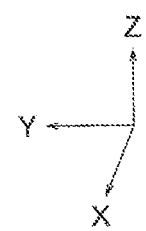

In FIG. 2A, the first substrate 101 and the second substrate 201 are, for example, silicon substrates. The two substrates are joined to each other by a copper pad, a bump, or a TSV (Through Silicon Via). In order to minimize substrate area, the first substrate 101 and the second substrate 201 need not entirely overlap with each other and at least a part of the light source cell array portion 11 may overlap with the pixel array portion 21. As long as the light signal S12 of the light source cell array portion 11 can be received by a desired pixel inside the pixel array portion 21, a distance between the first substrate 101 and the second substrate 201 may be about a few centimeters or the first substrate 101 and the second substrate 201 may be in close proximity with each other. For example, the first substrate 101 and the second substrate 201 may be joined to each by mounting of solder or the like.

In addition, on the second substrate 201, the shorter a distance between the pixel array portion 21 and the pixel signal processing circuit 23, the better. Furthermore, an optical center position between the pixel array portion 21 and the light source cell array portion 11 and a substrate center position between the first substrate 101 and the second substrate 201 may or may not coincide with each other. An optimum position of the pixel array portion 21 can be selected according to specifications.

In addition, on the second substrate 201, the pixel control circuit 22 is arranged in a direction parallel to an output direction of the pixel signal S22 and the pixel signal processing circuit 23 is arranged in a direction perpendicular to the output direction of the pixel signal S22. In other words, the pixel control circuit 22 and the pixel signal processing circuit 23 are arranged in perpendicular directions to each other. Note that the position of the pixel logic circuit 25 is not limited to the position in FIG. 2A and may be appropriately arranged in a space of the second substrate 201.

Furthermore, while a planar region of the pixel array portion 21 is a rectangle with the X direction as a short side direction and the Y direction as a long side direction, the planar region may be a square and is determined in accordance with a specification of a sum-of-product computation. For example, longer readout wiring is required when there is a larger number of convolutions (number of additions) in the sum-of-product computation. In this case, the rectangle of the pixel array portion 21 shown in FIG. 2A is preferable.

Figure 2B:
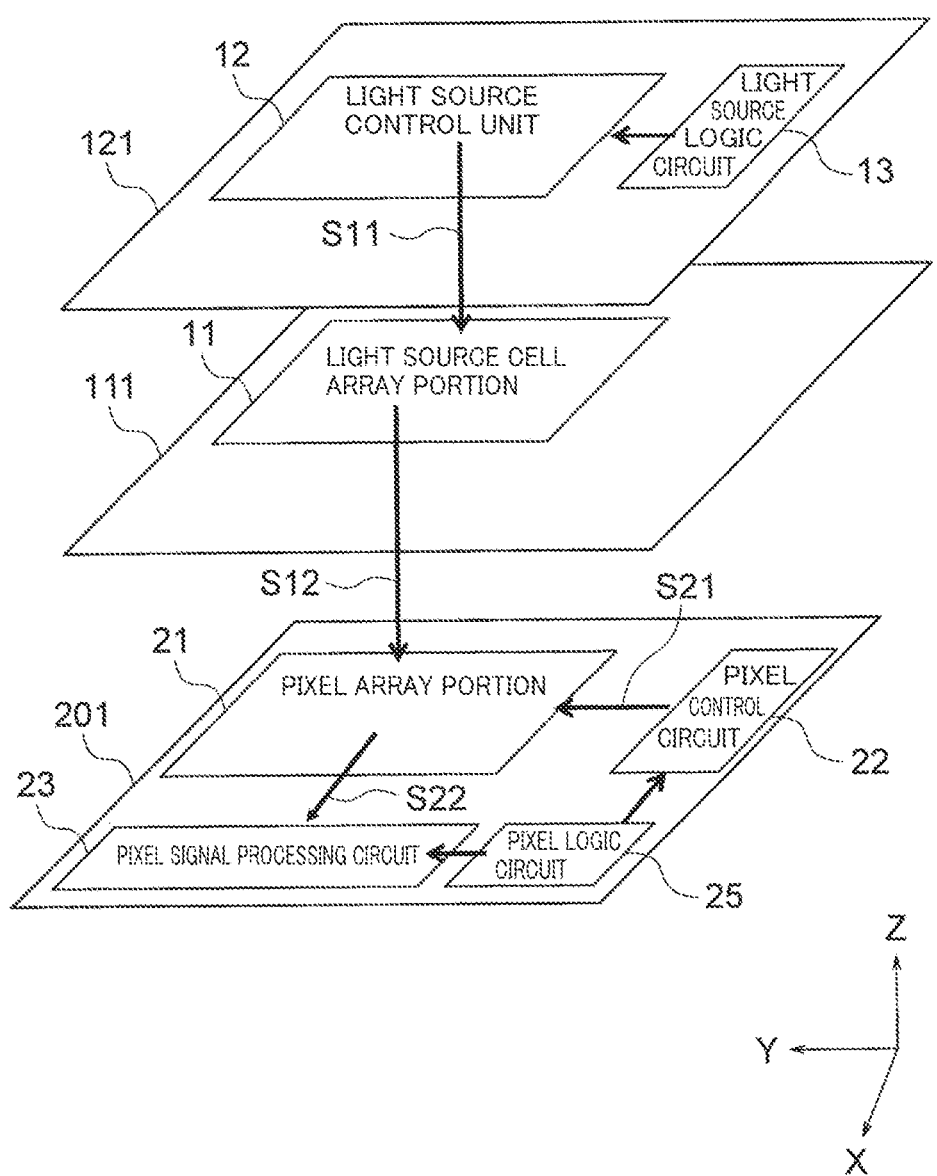
FIG. 2B is a diagram showing an example of a structure of the imaging apparatus according to the first embodiment.

In FIG. 2B, a light source system has a two-layer structure in which a light source substrate 111 and a light source control substrate 121 are stacked on top of each other. The light source substrate 111 and the light source control substrate 121 are, for example, silicon substrates. The light source substrate 111 is arranged on an intermediate layer between the light source control substrate 121 and the second substrate 201 and the light source control substrate 121 is arranged on an uppermost layer.

The light source cell array portion 11 is arranged on the light source substrate 111. On the other hand, the light source control circuit 12 and the light source logic circuit 13 are arranged on the light source control substrate 121. The first substrate 101 shown in FIG. 2A or the light source substrate 111 and the light source control substrate 121 shown in FIG. 2B respectively corresponds to the first substrate group. In other words, the first substrate group may be a single substrate or a plurality of substrates.

Figure 2C:
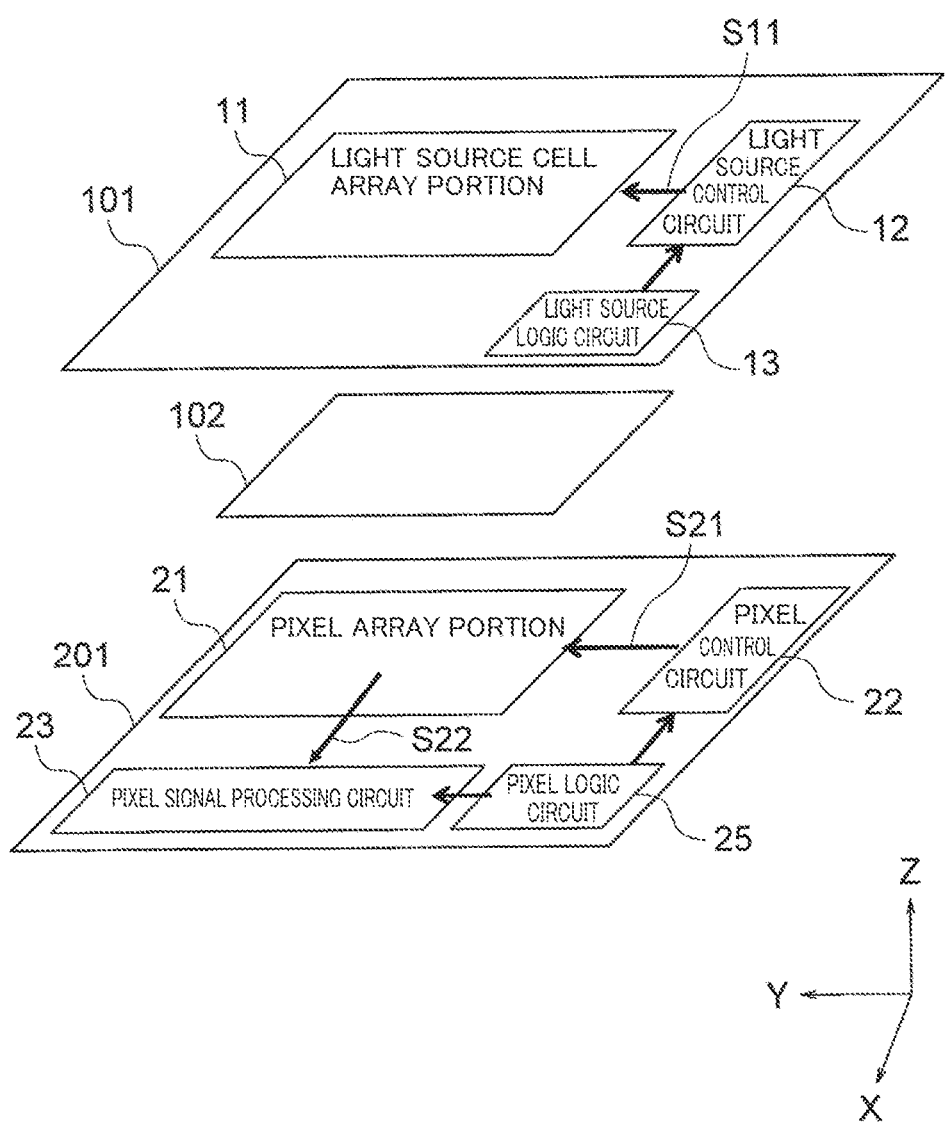
FIG. 2C is a diagram showing an example of a structure of the imaging apparatus according to the first embodiment.

In FIG. 2C, the shutter 102 is provided between the light source cell array portion 11 and the pixel array portion 21. The shutter 102 is configured to open in an on-state in which the light source cell array portion 11 outputs the light signal S12 and closes in an off-state in which the source cell array portion 11 does not output the light signal. For example, the shutter 102 may be constituted of a mechanical shutter or a liquid crystal shutter. A light-shielding function of shielding unnecessary light to the pixel array portion 21 when the light source cell array portion 11 changes to an off-state can be realized with the shutter 102.

Figure 2D:
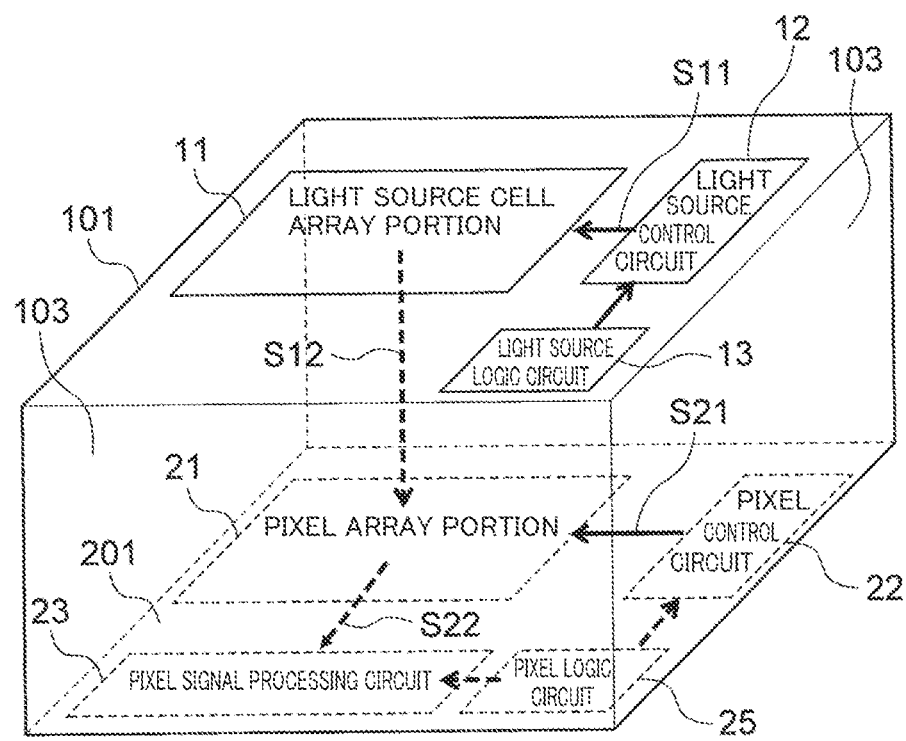
FIG. 2D is a diagram showing an example of a structure of the imaging apparatus according to the first embodiment.

In FIG. 2D, a black mask 103 is provided on an edge portion of the first substrate 101 and an edge portion of the second substrate 201. The black mask 103 is constituted of a light absorber. Due to the black mask 103, external light entering from a gap between the first substrate 101 and the second substrate 201 can be shielded. Accordingly, since the pixel array portion 21 can be configured to only receive the light signal S12, computation accuracy is improved.

In FIG. 2E, the first substrate 101 and the second substrate 201 are housed inside a package 104 with a light-shielding property. The package 104 is also constituted of a light absorber. Due to the package 104, external light entering from a gap between the first substrate 101 and the second substrate 201 can be shielded in a similar manner to the black mask 103. Accordingly, since the pixel array portion 21 can be configured to only receive the light signal S12, computation accuracy is improved.

Figure 3A:
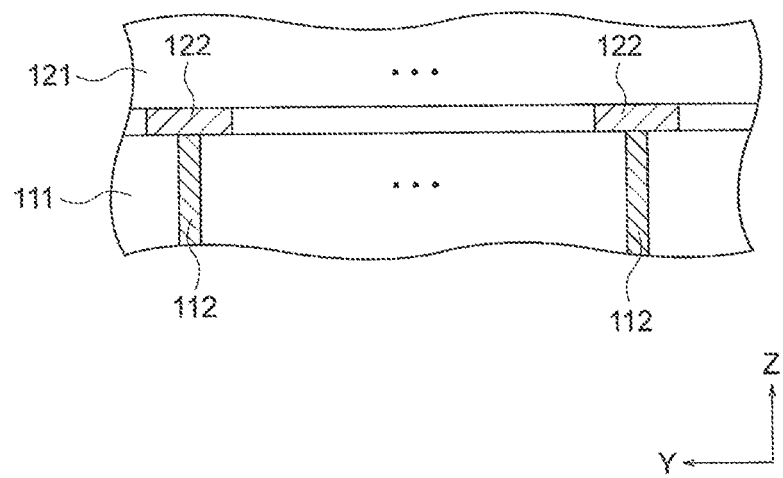
FIG. 3A is a sectional view schematically showing a bonding form between a light source substrate and a light source control substrate shown in FIG. 2B.

FIG. 3A is a sectional view schematically showing a bonding form between the light source substrate 111 and the light source control substrate 121 shown in FIG. 2B. In FIG. 3A, a plurality of through electrodes 112 formed on the light source substrate 111 and a plurality of connection terminals 122 formed on the light source control substrate 121 are joined with each other. The through electrodes 112 and the connection terminals 122 can be formed of, for example, a metal such as copper. Note that the gap between the light source substrate 111 and the light source control substrate 121 is filled with an insulating film.

The through electrodes 112 penetrate the light source substrate 111 and are electrically connected to the light source cell array portion 11 via a wiring layer (not illustrated) including various wirings. The connection terminals 122 are formed on a surface of the light source control substrate 121 (a bonding surface with the light source substrate 111). The connection terminals 122 are connected to the light source control circuit 12 and the light source logic circuit 13 arranged on the light source control substrate 121.

In the bonding form shown in FIG. 3A, the light source control signal S11 of the light source control circuit 12 is transmitted from the connection terminals 122 to respective light sources of the light source cell array portion 11 via the through electrodes 112.

Figure 3B:
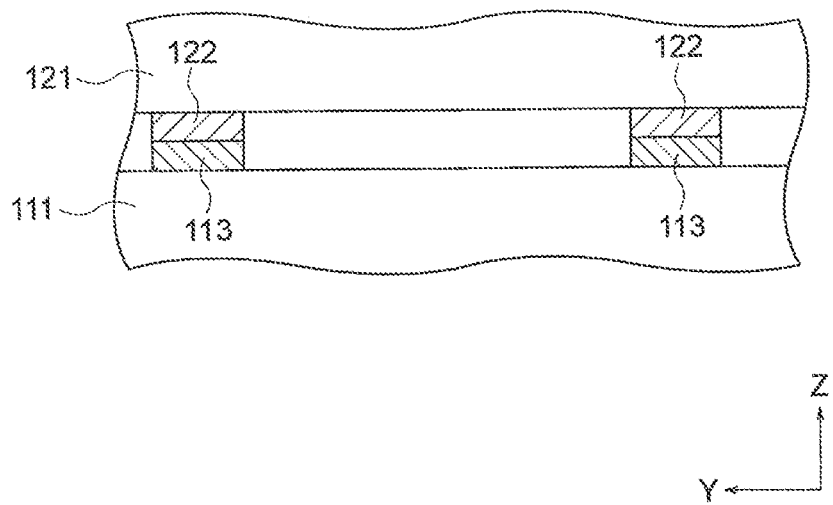
FIG. 3B is a sectional view schematically showing another bonding form between the light source substrate and the light source control substrate.

FIG. 3B is a sectional view schematically showing another bonding form of the light source substrate 111 and the light source control substrate 121. The bonding form shown in FIG. 3B is so-called Cu—Cu bonding in which a plurality of connection terminals 113 formed on the light source substrate 111 and a plurality of connection terminals 122 formed on the light source control substrate 121 are bonded to each other. The connection terminals 113 can be formed by a metal such as copper in a similar manner to the connection terminals 122 and are electrically connected to the light source cell array portion 11 via wirings (not illustrated). Note that even in this bonding form, the gap between the light source substrate 111 and the light source control substrate 121 is filled with an insulating film.

In the bonding form shown in FIG. 3B, the light source control signal S11 of the light source control circuit 12 is transmitted from the connection terminals 122 to respective light sources of the light source cell array portion 11 via the connection terminals 113.

Note that although omitted in FIGS. 3A and 3B, the light source cell array portion 11 is formed on a higher layer than the through electrodes 112 or the connection terminals 113. In addition, the light source control circuit 12 and the light source logic circuit 13 are formed on a higher layer than the connection terminals 122.

Figure 4A:
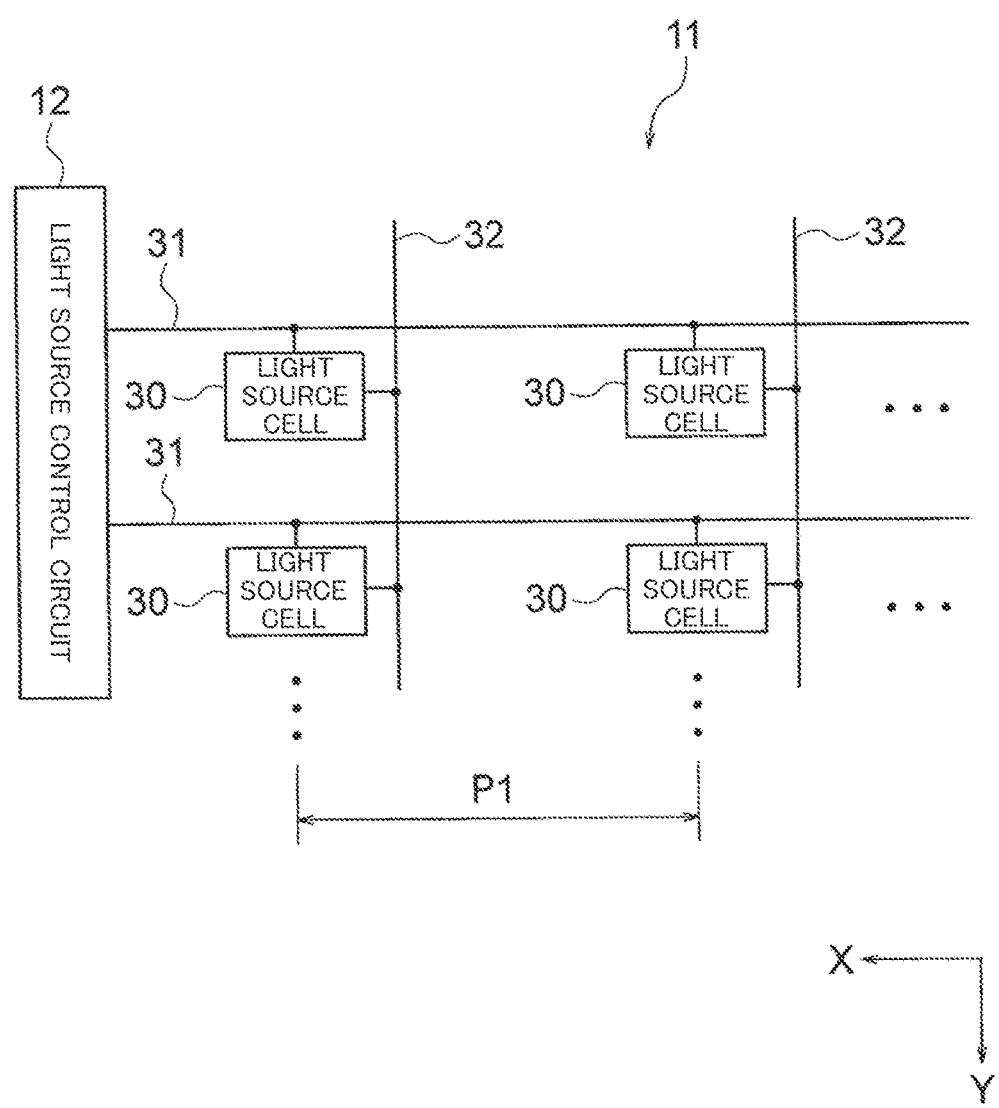
FIG. 4A is a diagram showing a schematic configuration of a light source cell array portion.

FIG. 4A is a diagram showing a schematic configuration of the light source cell array portion 11. As shown in FIG. 4A, a plurality of light source cells 30 are arranged in a two-dimensional pattern in the light source cell array portion 11. Each light source cell 30 is arranged in a vicinity of an intersection of a light source drive wiring 31 and a light source drive wiring 32 which is orthogonal to the light source drive wiring 31.

Figure 4B:
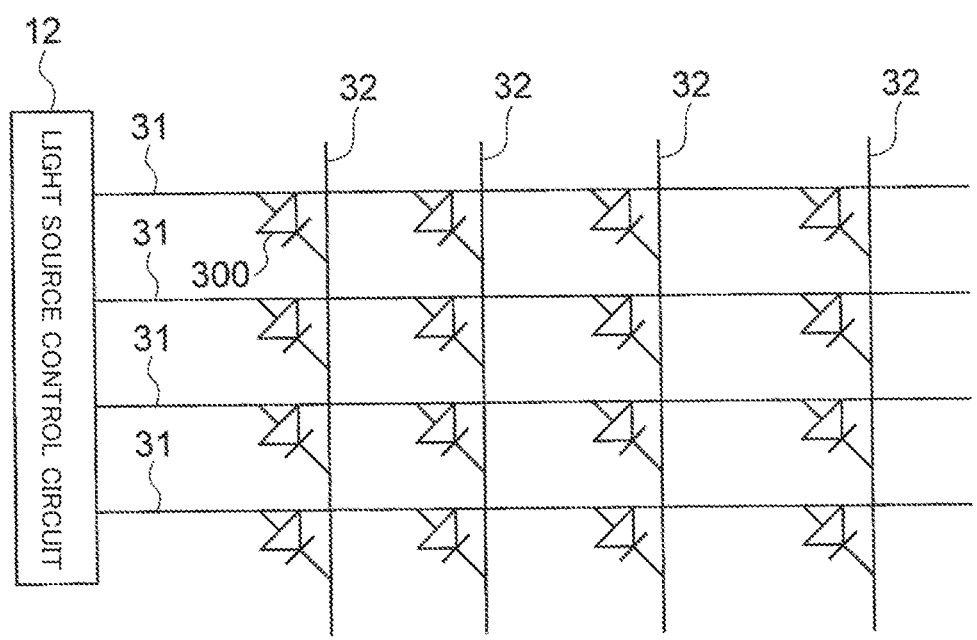
FIG. 4B is a diagram showing an example of a light source cell.

FIG. 4B is a diagram showing an example of the light source cell 30. In FIG. 4B, the light source cell 30 is constituted of a light-emitting element 300. In the light-emitting element 300, an anode is connected to the light source drive wiring 31 and a cathode is connected to the light source drive wiring 32. As the light-emitting element 300, for example, an LED (Light Emitting Diode), an SLED (Super Light Emitting Diode), an OLED (Organic Light Emitting Diode), and a laser (VCSEL) can be applied. Each light-emitting element 300 is configured to emit light and generate the light signal S12 in accordance with the light source control signal S11 input from the light source control circuit 12 through the light source drive wiring 31.

The light source cell array portion 11 shown in FIG. 4B is driven by a passive matrix system in which each light-emitting element 300 is controlled in a time-shared manner. In this drive system, light of each light-emitting element 300 or, in other words, a wavelength of the light signal S12 may differ for each light source cell 30 or may be the same in all light source cells 30. In addition, while the wavelength of the light signal S12 may be within a range from infrared light to visible light, the wavelength is preferably a long wavelength. The wavelength of the light signal S12 may be selected in accordance with a light-receiving range of the pixel array portion 21.

Figure 4C:
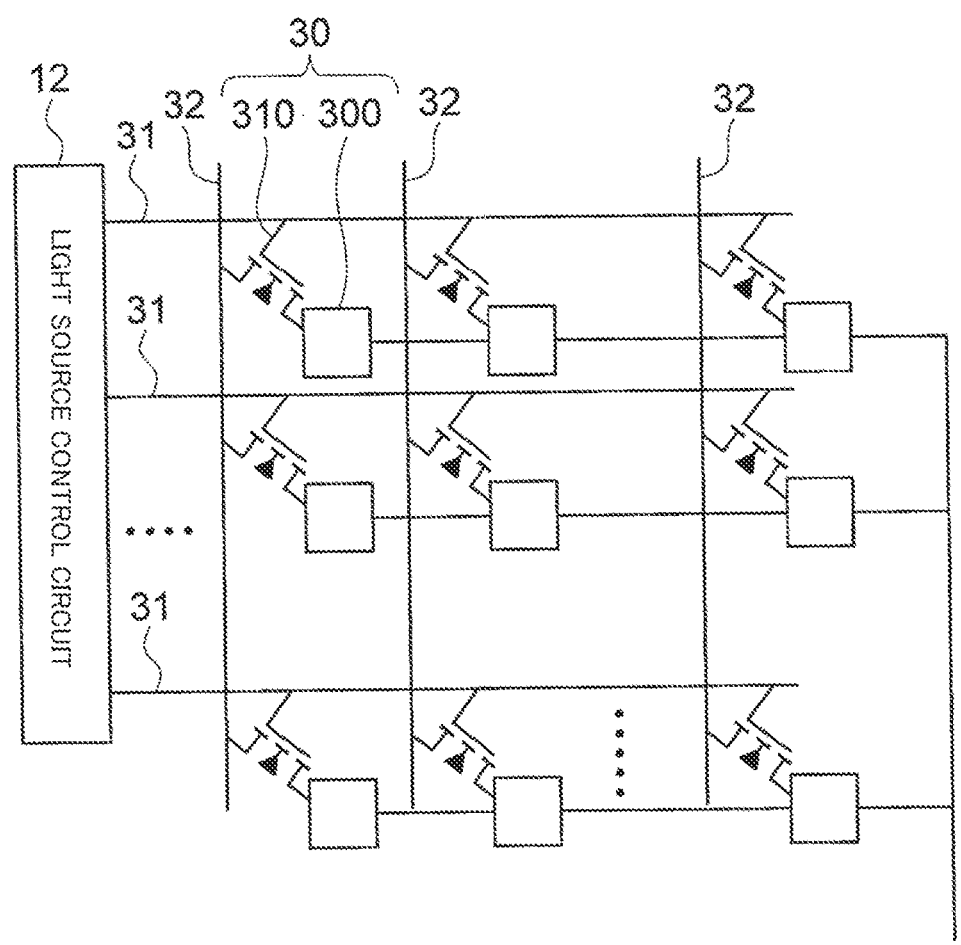
FIG. 4C is a diagram showing another example of the light source cell.

FIG. 4C is a diagram showing another example of the light source cell 30. An active element 310 is provided in addition to the light-emitting element 300 in the light source cell 30. As shown in FIG. 4C, the active element 310 is constituted of, for example, an N-channel MOS (Metal Oxide Semiconductor) transistor. In this case, in the active element 310, a gate is connected to the light source drive wiring 31, a drain is connected to the light-emitting element 300, and a source is connected to the light source drive wiring 32.

The light source cell array portion 11 in FIG. 4C is driven in an active matrix system in which the light-emitting element 300 is driven independently of other light-emitting elements 300 by the active element 310. Even in this drive system, light of each light-emitting element 300 or, in other words, a wavelength of the light signal S12 may differ for each light source cell 30 or may be the same in all light source cells 30. In addition, while the wavelength of the light signal S12 may be within a range from infrared light to visible light, the wavelength is preferably a long wavelength. The wavelength of the light signal S12 may be selected in accordance with a light-receiving range of the pixel array portion 21.

Figure 4D:
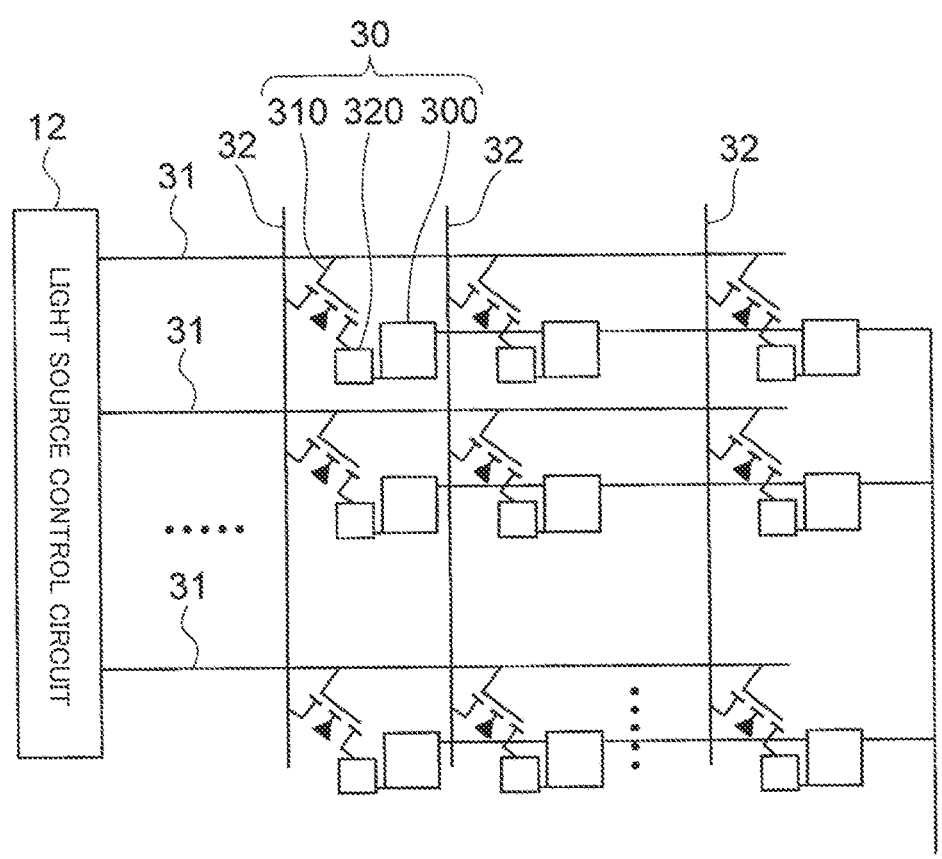
FIG. 4D is a diagram showing yet another example of the light source cell.

FIG. 4D is a diagram showing yet another example of the light source cell 30. A storage portion 320 is provided between the light-emitting element 300 and the active element 310 in the light source cell 30. As the storage portion 320, an SRAM (Static Random Access Memory), a latch circuit, a flip-flop, and a non-volatile memory can be applied. In the light source cell 30, when a voltage is applied between the light source drive wiring 31 and the light source drive wiring 32 or, in other words, when the light source control signal S11 is input to each light source cell 30 through the light source drive wiring 31, an applied voltage of each light-emitting element 300 is determined in accordance with a state of each storage portion 320. The applied voltage corresponds to a coefficient of a sum-of-product computation of the pixel array portion 21. In other words, the storage portion 320 is configured to store data related to a coefficient of a sum-of-product computation. The data may be stored in multiple bits. In addition, the data may include not only a coefficient of a sum-of-product computation but also other information.

Note that the configuration of the light source cell 30 is not limited to the configurations shown in FIG. 4B, FIG. 4C, and FIG. 4D. For example, the light source cell 30 may have a transmissive or a reflective liquid crystal module or electronic paper in addition to the light-emitting element 300.

Figure 5A:
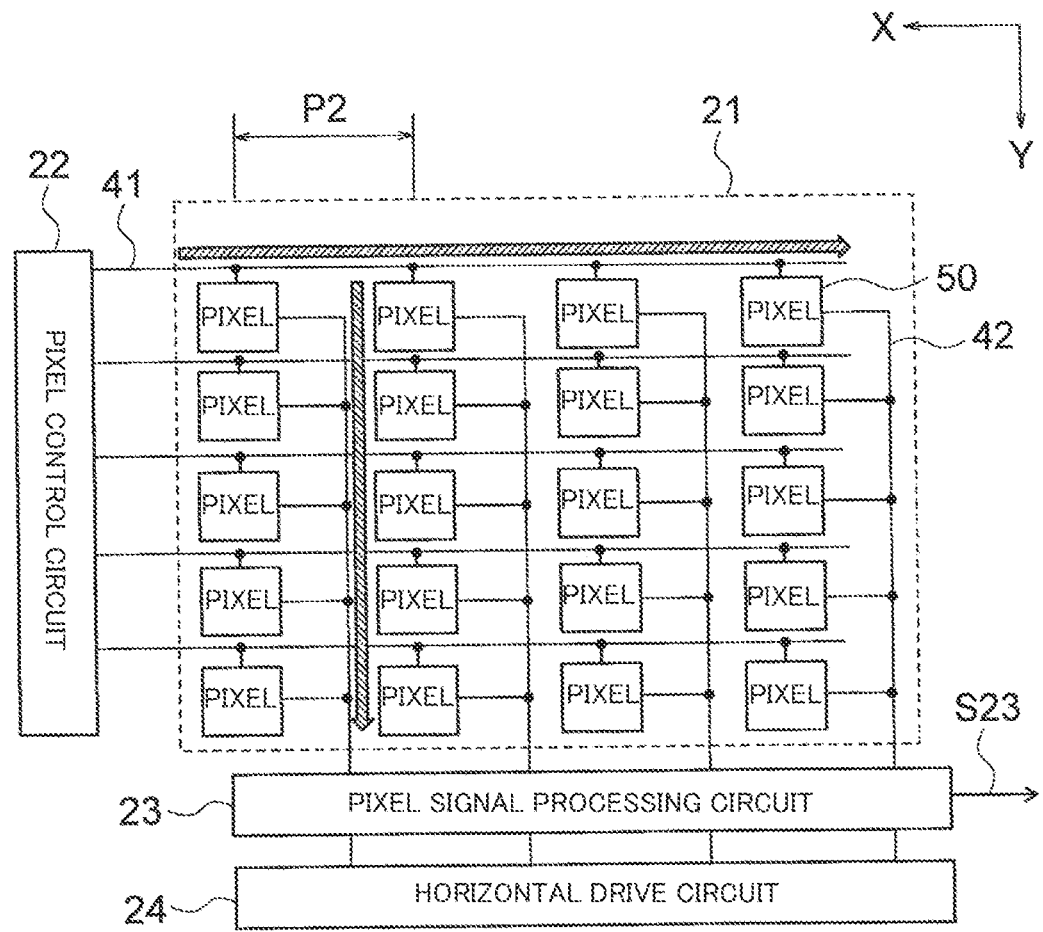
FIG. 5A is a diagram showing a schematic configuration of a pixel array portion.

FIG. 5A is a diagram showing a schematic configuration of the pixel array portion 21. As shown in FIG. 5A, in the pixel array portion 21, a plurality of pixels 50 are arranged in a two-dimensional pattern between a pixel drive wiring 41 connected to the pixel control circuit 22 and a pixel read wiring 42 connected to the pixel signal processing circuit 23. In the present embodiment, while a center pitch P1 of the light source cells 30 shown in FIG. 4A is an integral multiple of a center pitch P2 of the pixels 50, alternatively, the center pitch P2 of the pixels 50 may be an integral multiple of the center pitch P1 of the light source cells 30. In other words, in the light source cells 30 and the pixels 50, the center pitch of one is an integral multiple of the center pitch of the other. That is, in the light source cells 30 and the pixels 50, the number of one is an integral multiple of the number of the other.

Each pixel 50 is configured to generate a photoelectric conversion signal of the light signal S12 in accordance with a pixel control signal S21 input through the pixel drive wiring 41. The photoelectric conversion signal is multiplied by the signal value of the pixel control signal S21 with light intensity or an exposure time of the light signal S12 or, in other words, an electric charge amount received by the pixel 50 as coefficients. Next, the pixel array portion 21 is configured to sequentially add multiplications results in row units or column units through the pixel read wiring 42. Accordingly, an analog-system pixel signal S22 indicating a result of a sum-of-product computation is read to the pixel signal processing circuit 23. In the present embodiment, since a sum-of-product computation is performed in an analog system, digital processing need not be performed. Therefore, power consumed by a sum-of-product computation is reduced.

FIGS. 5B to 5F are diagrams showing an example of an equivalent circuit diagram of the pixel 50. Hereinafter, circuit configurations of the pixels described in the respective drawings will be described.

Figure 5B:
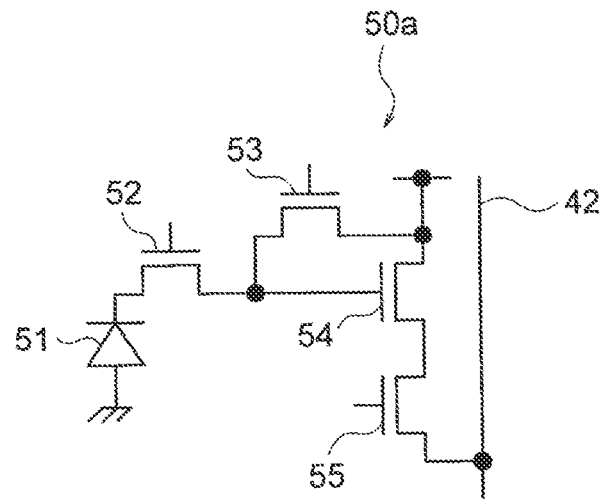
FIG. 5B is a diagram showing an example of an equivalent circuit diagram of a pixel.

A pixel 50a shown in FIG. 5B has a photodiode 51, a transfer transistor 52, a reset transistor 53, an amplifying transistor 54, and a selective transistor 55.

The photodiode 51 is configured to generate and accumulate charges (signal charges) corresponding to light intensity of the light signal S12. The photodiode 51 has its anode terminal grounded and its cathode terminal connected to the transfer transistor 52.

When turned on in response to a transfer signal from the pixel control circuit 22, the transfer transistor 52 is configured to read out the electric charge from the photodiode 51 and transfer the electric charge to the amplifying transistor 54. When turned on by a reset signal from the pixel control circuit 22, the reset transistor 53 is configured to reset a potential of the photodiode 51 by discharging the electric charge accumulated in the photodiode 51 to a power supply. The amplifying transistor 54 is configured to output a pixel signal S22 in accordance with the electric charge amount accumulated in the photodiode 51 to the selective transistor 55. When turned on in response to a selection signal that is one of the pixel control signals S21, the selective transistor 55 is configured to output the pixel signal S22 to the pixel read wiring 42. The pixel signal S22 is transmitted to the pixel signal processing circuit 23 via the pixel read wiring 42.

Figure 5C:
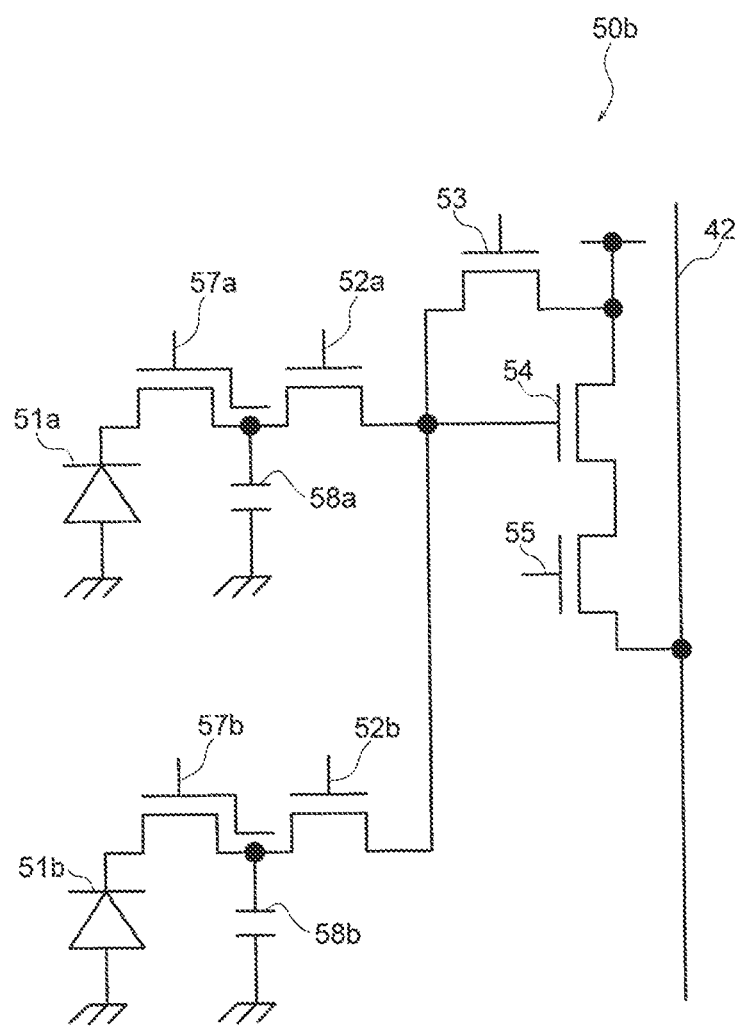
FIG. 5C is a diagram showing an example of an equivalent circuit diagram of a pixel.

A pixel 50b shown in FIG. 5C includes two photodiodes 51a and 51b. An electric charge generated by a photoelectric conversion of the photodiode 51a is temporarily stored in a memory transistor 57a and a capacitor 58a. The stored electric charge is transferred to the amplifying transistor 54 by the transfer transistor 52a. On the other hand, an electric charge generated by a photoelectric conversion of the photodiode 51b is temporarily stored in a memory transistor 57b and a capacitor 58b. The stored electric charge is transferred to the amplifying transistor 54 by the transfer transistor 52b.

The amplifying transistor 54 is configured to output, to the selective transistor 55, a pixel signal S22 in accordance with an electric charge amount transferred from the transfer transistor 52a or the transfer transistor 52b. The selective transistor 55 is configured to output the pixel signal S22 to the pixel read wiring 42. The pixel signal S22 is transmitted to the pixel signal processing circuit 23 via the pixel read wiring 42. A potential of each of the photodiodes 51a and 51b is reset by the reset transistor 53.

Figure 5D:
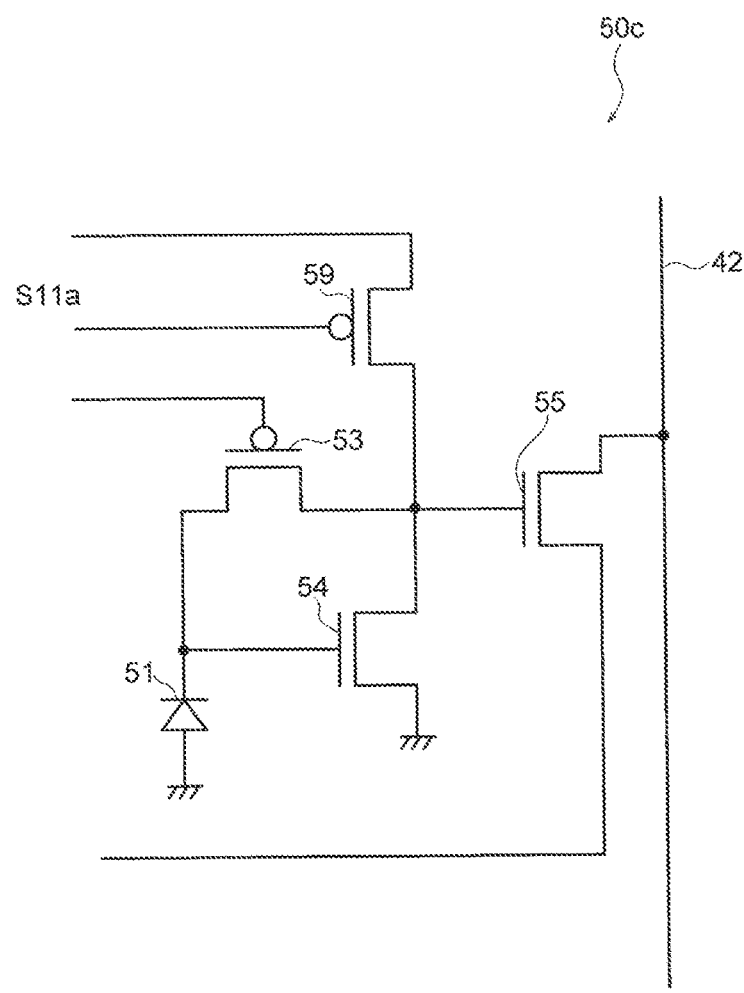
FIG. 5D is a diagram showing an example of an equivalent circuit diagram of a pixel.

A pixel 50c shown in FIG. 5D is an example of a so-called PWM (Pulse Wide Modulation) pixel. In the pixel 50b, a slope signal S11a that is one of the pixel control signals S21 is input to a gate of a P-channel MOS transistor 59. The MOS transistor 59 is connected in series to the amplifying transistor 54. The selective transistor 55 is configured to output, to the pixel read wiring 42, a PWM-system pixel signal S22 indicating a result of comparison between an output of the MOS transistor 59 and an output of the amplifying transistor 54. The pixel signal S22 is transmitted to the pixel signal processing circuit 23 via the pixel read wiring 42.

Figure 5E:
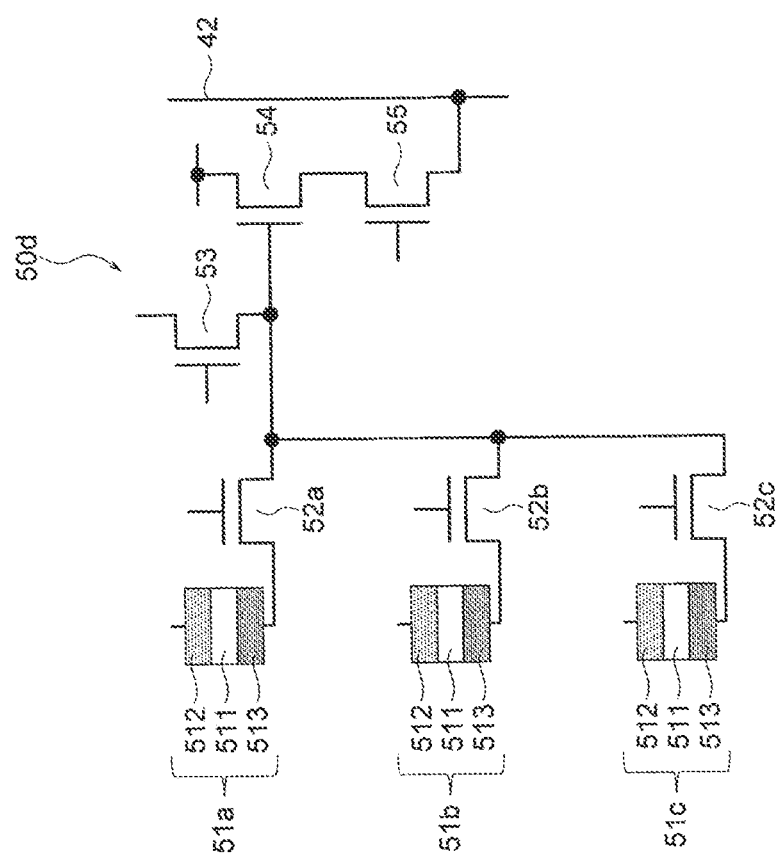
FIG. 5E is a diagram showing an example of an equivalent circuit diagram of a pixel.

In a pixel 50d shown in FIG. 5E, photodiodes 51a to 51c include a photoelectric conversion film 511, a transparent electrode 512, and a lower electrode 513. The photoelectric conversion film 511 is an organic photoelectric conversion film or an inorganic photoelectric conversion film. The transparent electrode 512 is arranged on an upper surface of the photoelectric conversion film 511. The lower electrode 513 is arranged on an upper surface of the photoelectric conversion film 511. In other words, the transparent electrode 512 is sandwiched between the transparent electrode 512 and the lower electrode 513. For example, a global shutter is realized by having the photoelectric conversion film 511 control a voltage of the transparent electrode 512.

Electric charges photoelectrically converted by the photoelectric conversion films 511 of the photodiodes 51a to 51c are respectively transferred to the amplifying transistor 54 by the transfer transistors 52a to 52c. The amplifying transistor 54 is configured to output the pixel signal S22 in accordance with the electric charge amount accumulated in the photodiode 51 to the selective transistor 55. The selective transistor 55 is configured to output the pixel signal S22 to the pixel read wiring 42. The pixel signal S22 is transmitted to the pixel signal processing circuit 23 via the pixel read wiring 42. A potential of each photodiode is reset by the reset transistor 53.

Figure 5F:
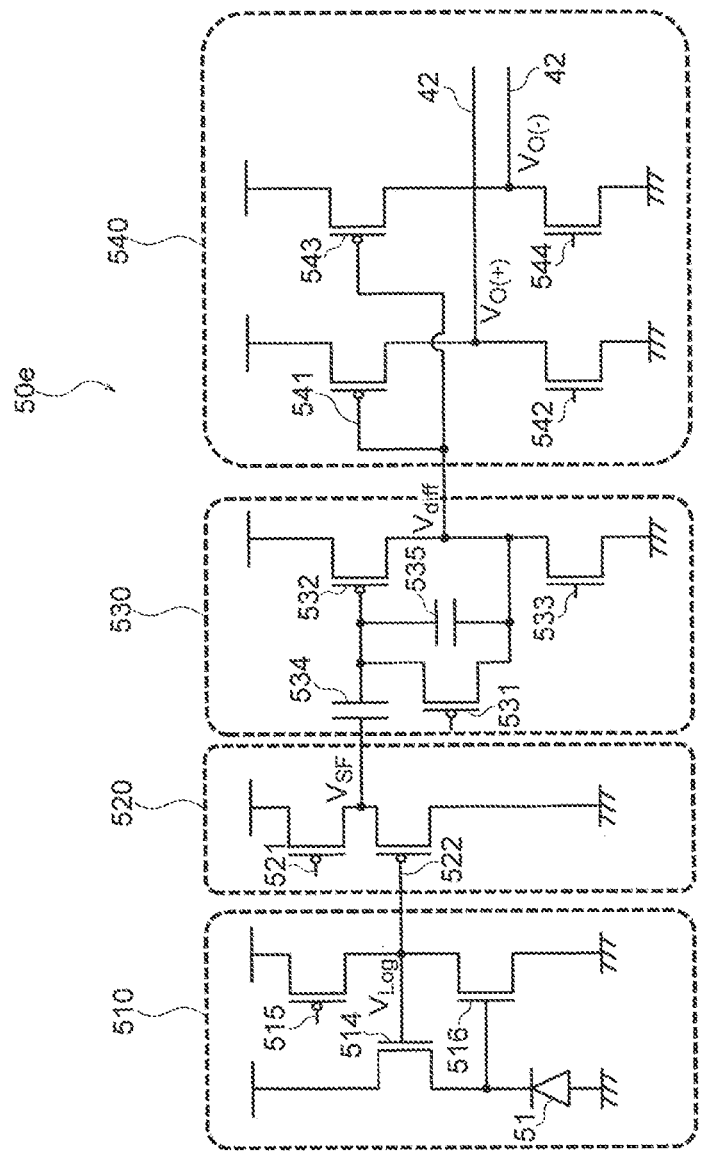
FIG. 5F is a diagram showing an example of an equivalent circuit diagram of a pixel.

A pixel 50e shown in FIG. 5F is an example of a DVS (Dynamic Vision Sensor) pixel configured to output a change in brightness. The pixel 50e includes a logarithmic transformation circuit 510, a buffer circuit 520, a subtraction circuit 530, and a quantization circuit 540.

The logarithmic transformation circuit 510 includes a photodiode 51, an N-channel MOS transistor 514, a P-channel MOS transistor 515, and an N-channel MOS transistor 516. The photodiode 51 and the MOS transistor 514 are connected in series. In addition, the MOS transistor 515 and the MOS transistor 516 are also connected in series. Furthermore, a gate of the MOS transistor 514 is connected to a drain of the MOS transistor 515 and a drain of the MOS transistor 516. The logarithmic transformation circuit 510 is configured to transform an electric charge photoelectrically converted by the photodiode 51 into a voltage Vlog of a logarithmic output.

The buffer circuit 520 includes a P-channel MOS transistor 521 and a P-channel MOS transistor 522. The MOS transistor 521 and the MOS transistor 522 are connected in series. The buffer circuit 520 is configured to output a source follower voltage VSF obtained by performing impedance transformation with respect to the voltage Vlog input to a gate of the MOS transistor 522.

The subtraction circuit 530 includes a P-channel MOS transistor 531, a P-channel MOS transistor 532, an N-channel MOS transistor 533, a capacitor 534, and a capacitor 535. The MOS transistor 532 and the MOS transistor 533 are connected in series. A capacitor 534 is connected to a gate of the MOS transistor 532. The MOS transistor 531 and the capacitor 535 are connected in parallel between the gate and a drain of the MOS transistor 532. The subtraction circuit 530 is configured to output a difference voltage Vdiff from a previous signal.

The quantization circuit 540 includes a P-channel MOS transistor 541, an N-channel MOS transistor 542, a P-channel MOS transistor 543, and an N-channel MOS transistor 544. The MOS transistor 541 and the MOS transistor 542 are connected in series. In addition, the MOS transistor 543 and the MOS transistor 544 are connected in series. In the quantization circuit 540, the difference voltage Vdiff input to respective gates of the MOS transistor 541 and the MOS transistor 543 is compared with two thresholds. Subsequently, a comparison result (VO(+), VO(−)) is transmitted to the pixel signal processing circuit 23 via the pixel read wiring 42 as the pixel signal S22. The pixel signal processing circuit 23 is configured to determine "+1", "0", and "−1" based on the pixel signal S22.

The pixel 50 arranged in the pixel array portion 21 is not limited to the pixels 50a to 50e shown in FIGS. 5B to 5F. For example, so-called convolution pixels configured to add pixel signals S22 of the respective pixels 50 may be arranged in the pixel array portion 21. In addition, a polarization sensor or a multi-spectral sensor may be arranged in addition to the CMOS image sensor and the DVS described above in the pixel array portion 21.

The polarization sensor further includes a diffractive element configured to polarize light incident to the photodiode 51. On the other hand, the multi-spectral sensor further includes a color filter configured to perform color separation on light incident to the photodiode 51.

Figure 6:
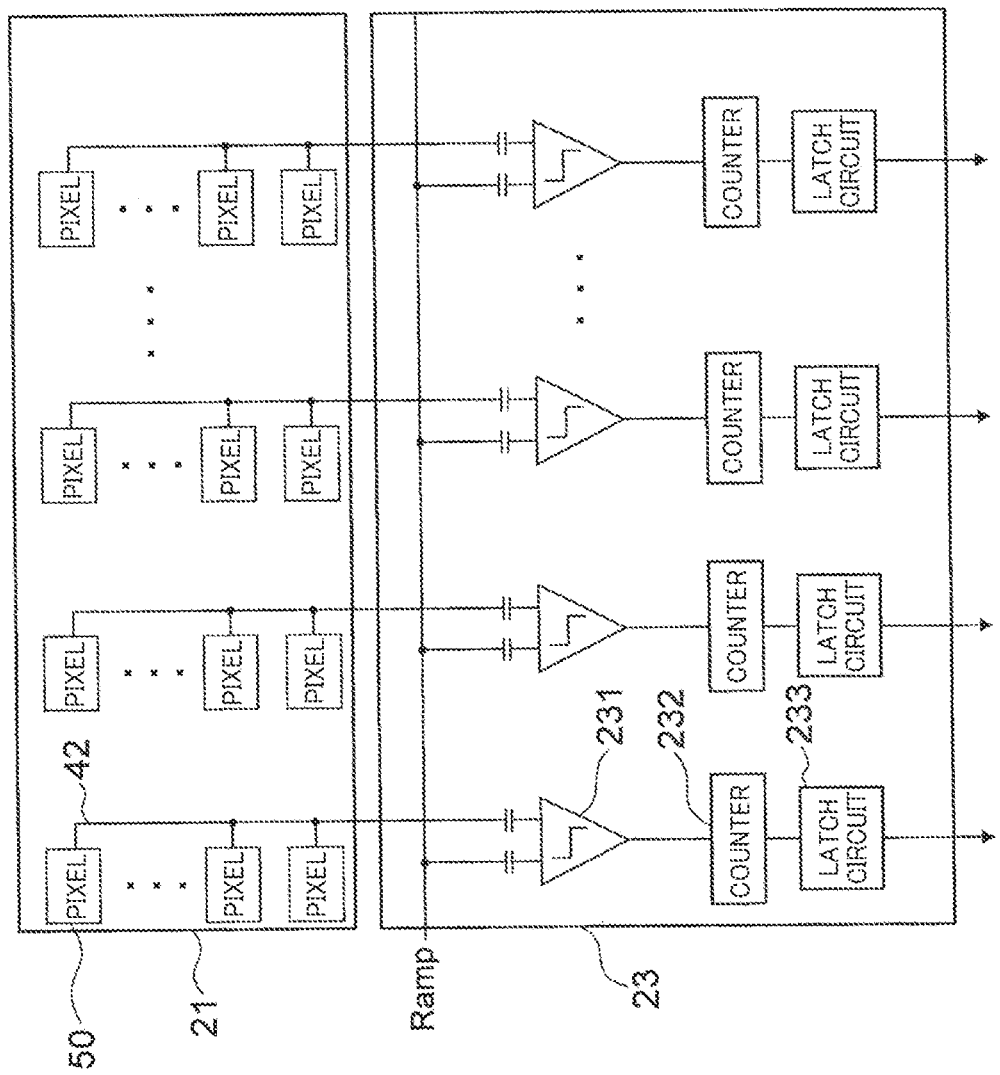
FIG. 6 is a diagram showing an example of a circuit configuration of an ADC included in a pixel signal processing circuit.

FIG. 6 is a diagram showing an example of a circuit configuration of an ADC (Analog to Digital Converter) included in the pixel signal processing circuit 23. The ADC shown in FIG. 6 includes a plurality of comparators 231, a plurality of counters 232, and a plurality of latch circuits 233.

The pixel signal S22 of the pixel 50 corresponding to any of the pixels 50a to 50e described above is input to a non-inverting input terminal of the comparators 231. A triangular wave ramp signal RAMP is input to an inverting input terminal. Each comparator 231 is configured to output a comparison result between the pixel signal S22 and the ramp signal RAMP. Each counter 232 is connected to an output terminal of the comparator 231. Each counter 232 is configured to count a change time of an output level of the comparator 231. Each latch circuit 233 is configured to store a counting result of each counter 232.

Note that the ADC included in the pixel signal processing circuit 23 is not limited to the single slope ADC shown in FIG. 6. For example, the pixel signal processing circuit 23 may include a pixel ADC configured to process the pixel signal S22 for each pixel, a column ADC configured to count a comparison time of the plurality of comparators 231 by one counter 232, a double integration ADC including an integrator circuit, a successive approximation (SAR) ADC, a ΔΣ type ADC, or the like. In addition, a resolution of the ADC can also be appropriately selected within a range of, for example, 1 bit to 12 bits.

As described above, the imaging apparatus 1 according to the present embodiment is configured such that a light signal S12 generated by the light source cell array portion 11 is subjected to a sum-of-product computation by the pixel array portion 21. Since using the light signal S12 enables coefficient (load) date necessary for the sum-of-product computation to be collectively transferred to the plurality of two-dimensionally arranged pixels 50, power necessary for data transfer is significantly reduced.

In addition, the coefficient data of the sum-of-product computation can be freely set by adjusting a light emission level of the light signal S12 with the light source cell array portion 11, adjusting a reception level of the light signal S12 with the pixel array portion 21, and multiplexing a wavelength of the light signal S12. Accordingly, it is possible to expand a width of expression of sum-of-product computation.

According to the present embodiment described above, since expressiveness of a coefficient during computation can be expanded with low latency, sophisticated calculations can be realized at low power. In particular, it is expected that a contribution can be made towards increasing efficiency of large-scale calculations used at data centers and the like. In addition, in the present embodiment, since the light source cell array portion 11 is laminated on the pixel array portion 21, a small-area layout can be realized. Furthermore, since the present disclosure enables a CMOS image sensor to be used as a sum-of-product computing element, the present disclosure is also able to reap benefits from technical progress made in CMOS image sensors.

Second Embodiment

Figure 7:
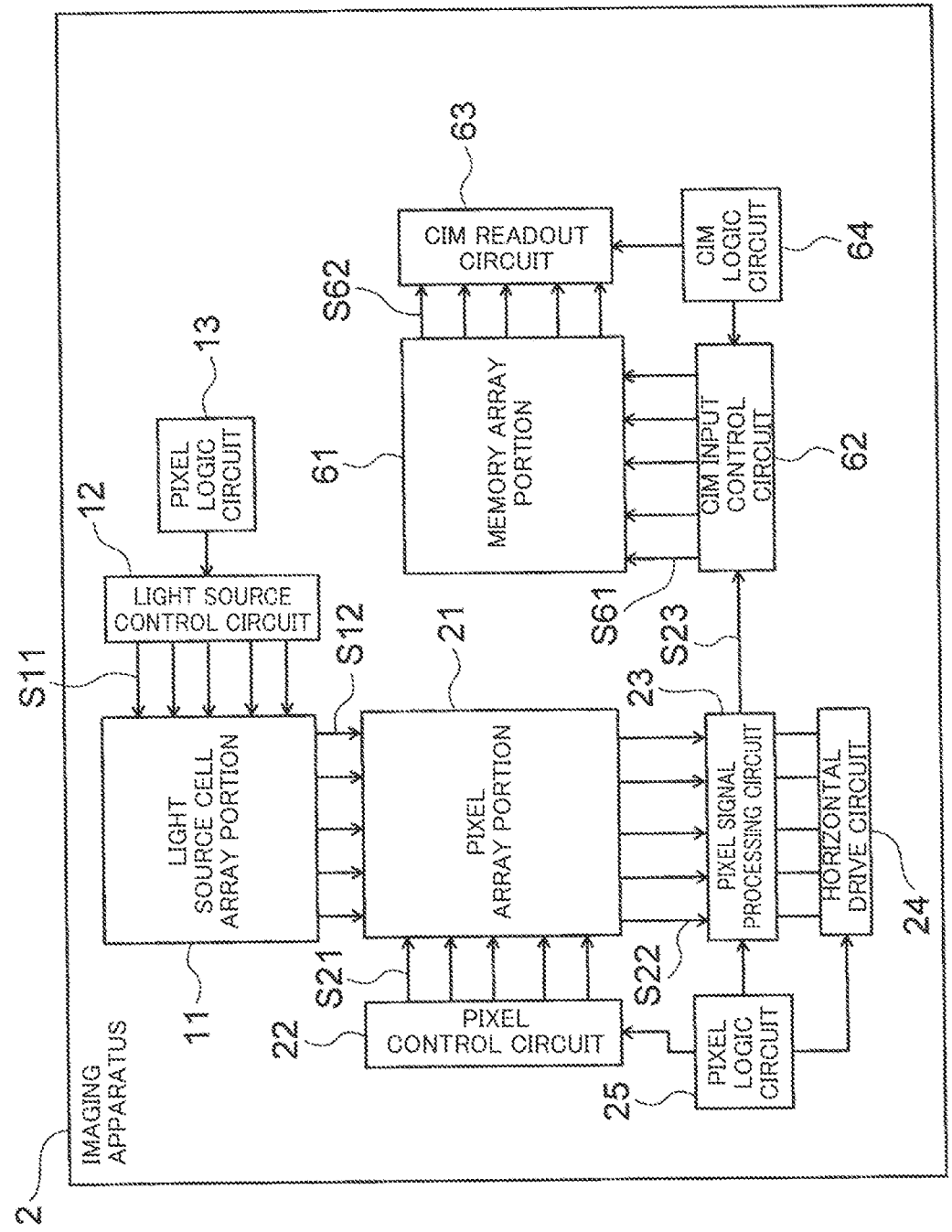
FIG. 7 is a block diagram showing a configuration of an imaging apparatus according to the second embodiment.

FIG. 7 is a block diagram showing a configuration of an imaging apparatus according to a second embodiment. Similar constituent elements to those in the first embodiment will be designated by the same reference signs and detailed descriptions thereof will be omitted.

In addition to the constituent elements of the imaging apparatus 1 shown in FIG. 1, the imaging apparatus 2 shown in FIG. 7 further includes a memory cell array portion 61, a CIM (Computing in memory) input control circuit 62, a CIM readout circuit 63, and a CIM logic circuit 64.

A plurality of memory cells are arranged in the memory cell array portion 61 in a two-dimensional pattern. The memory cell array portion 61 is configured to output, in one direction towards the CIM readout circuit 63, a convolution signal S62 indicating a result of subjecting a memory cell control signal S61 from the CIM input control circuit 62 to sum-of-product computation in an analog system. A circuit configuration example of the memory cell array portion 61 will be described later.

The CIM input control circuit 62 is constituted of, for example, a shift register and is configured to input the memory cell control signal S61 associated with a digital pixel signal S23 to each memory cell of the memory cell array portion 61 via a memory cell drive wiring (not illustrated in FIG. 7). The CIM input control circuit 62 is configured to, due to the memory cell control signal S61, sequentially or collectively scan each memory cell of the memory cell array portion 61 and cause the convolution signal S62 obtained by a sum-of-product computation using a memory value of each memory cell to be output to the CIM readout circuit 63.

The CIM readout circuit 63 performs AD conversion processing or the like with respect to the convolution signal S62 read from the memory cell array portion 61.

The CIM logic circuit 64 is configured to receive a clock signal input from outside and data for commanding an operating mode or the like and to control operations of the memory cell array portion 61 as a whole. For example, the CIM logic circuit 64 is configured to generate a vertical synchronization signal, a horizontal synchronization signal, and the like based on the input clock signal and to supply the generated signals to the CIM input control circuit 62 and the CIM readout circuit 63.

Figure 8A:
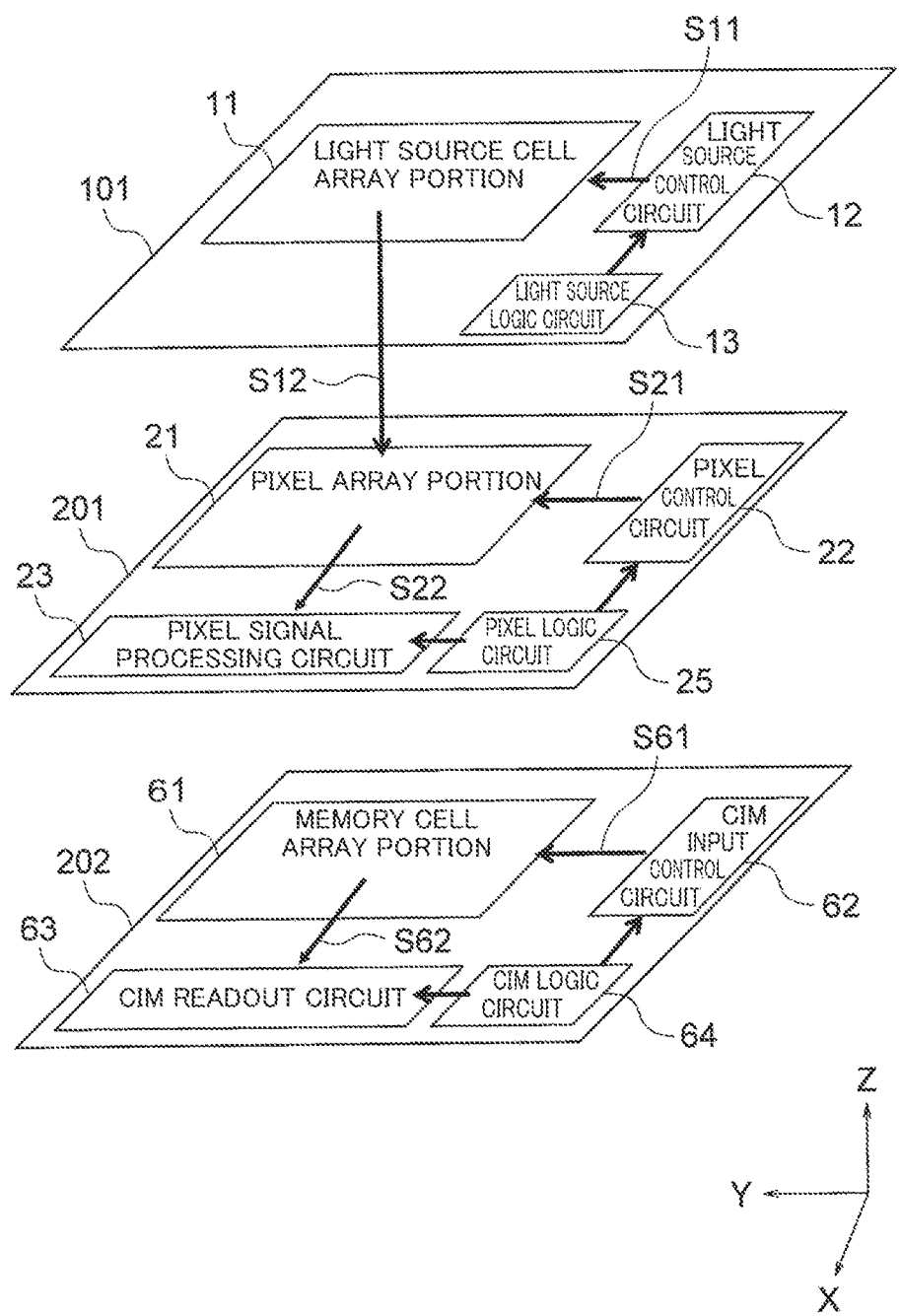
FIG. 8A is a diagram showing an example of a structure of the imaging apparatus according to the second embodiment.

FIG. 8A is a diagram showing an example of a structure of the imaging apparatus 2. In the present embodiment, the first substrate 101, the second substrate 201, and a memory substrate 202 are laminated in this order. The first substrate 101 is arranged in an uppermost layer, the memory substrate 202 is arranged in a lowermost layer, and the second substrate 201 is arranged in an intermediate layer between the first substrate 101 and the memory substrate 202. The light source cell array portion 11, the light source control circuit 12, and the light source logic circuit 13 are arranged on the first substrate 101 in a similar manner to FIG. 2A. In a similar manner to FIG. 2A, the pixel array portion 21, the pixel control circuit 22, the pixel signal processing circuit 23, and the pixel logic circuit 25 are arranged on the second substrate 201. The memory substrate 202 is laminated under the second substrate 201.

The memory substrate 202 is, for example, a silicon substrate and is bonded to the second substrate 201 by a copper pad, a bump, a TSV, or the like. The memory substrate 202 constitutes the second substrate group together with the second substrate 201. In order to minimize substrate area, the memory substrate 202 need not entirely overlap with the second substrate 201 and at least a part of the memory substrate 202 may overlap with the second substrate 201.

The memory cell array portion 61, the CIM input control circuit 62, the CIM readout circuit 63, and the CIM logic circuit 64 are arranged on the memory substrate 202. In FIG. 8A, the CIM input control circuit 62 is arranged in a direction parallel to the output direction of the convolution signal S62 and, at the same time, the CIM readout circuit 63 is arranged in a direction perpendicular to the output direction of the convolution signal S62. In other words, the CIM input control circuit 62 and the CIM readout circuit 63 are arranged in directions perpendicular to each other. Note that the position of the CIM logic circuit 64 is not limited to the position in FIG. 8A and the CIM logic circuit 64 may be appropriately arranged in a space in the memory substrate 202.

Furthermore, while a planar region of the memory cell array portion 61 in FIG. 8A is a rectangle with the X direction as a short side direction and the Y direction as a long side direction, the planar region may be a square and is determined in accordance with a specification of a sum-of-product computation. For example, longer readout wiring is required when there is a larger number of convolutions (number of additions) in the sum-of-product computation. In this case, the rectangle of the memory cell array portion 61 shown in FIG. 8A is preferable.

Figure 8B:
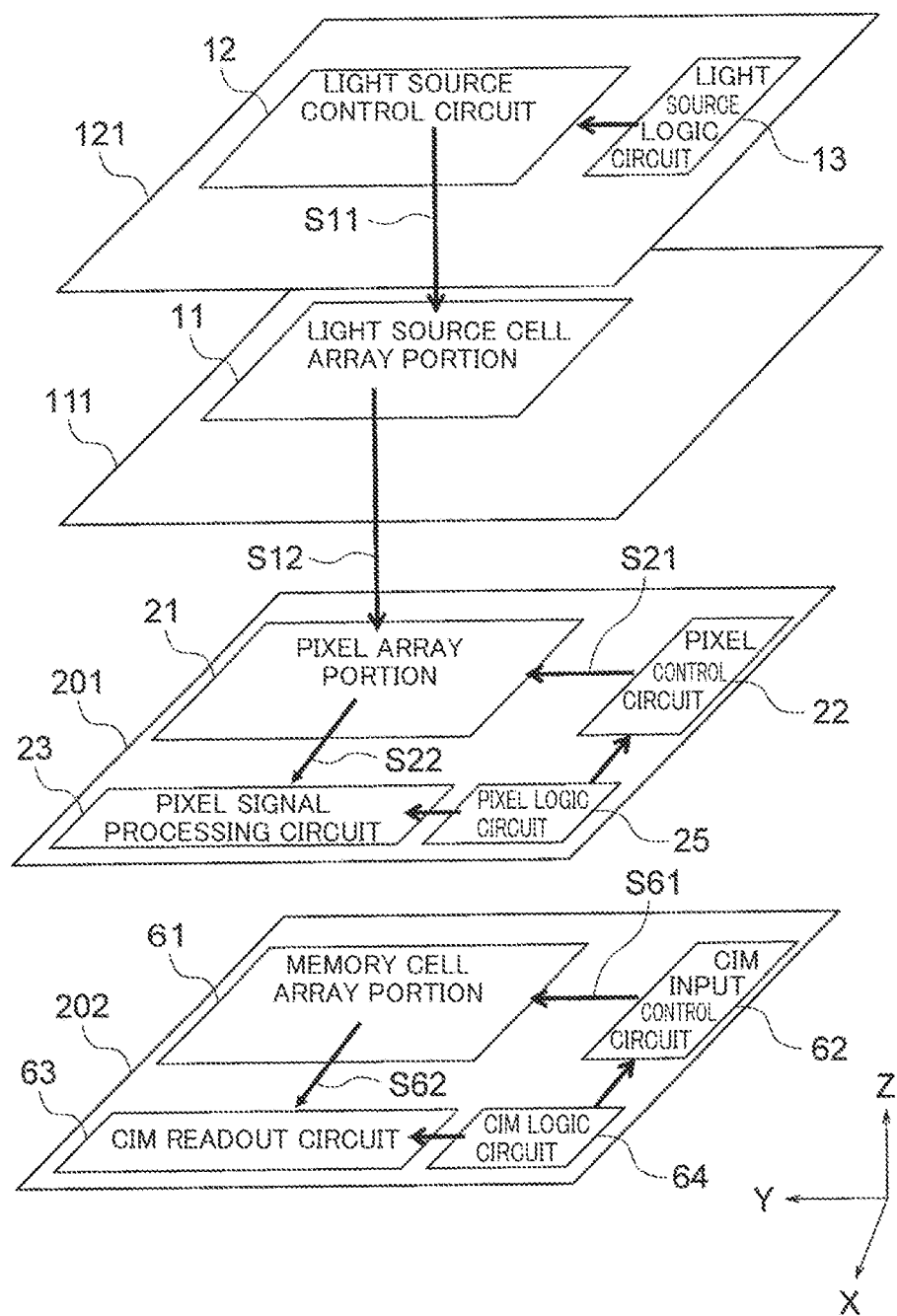
FIG. 8B is a diagram showing another example of a structure of the imaging apparatus according to the second embodiment.

FIG. 8B is a diagram showing another example of the structure of the imaging apparatus 2. In FIG. 8B, in a similar manner to FIG. 2B, a light source system has a two-layer structure in which the light source substrate 111 and the light source control substrate 121 are laminated by being stacked on top of each other. The light source cell array portion 11 is arranged on the light source control substrate 121. On the other hand, the light source control circuit 12 and the light source logic circuit 13 are arranged on the light source control substrate 121.

Note that the imaging apparatus 2 according to the present embodiment may also be provided with the shutter 102 (refer to FIG. 2C) between the light source cell array portion 11 and the pixel array portion 21 in a similar manner to the first embodiment. In addition, the black mask 103 (refer to FIG. 2D) may be provided on an edge portion of the first substrate 101 and an edge portion of the second substrate 201. Furthermore, the imaging apparatus 2 may be housed inside the package 104 (refer to FIG. 2E) with a light-shielding property.

Figure 9:
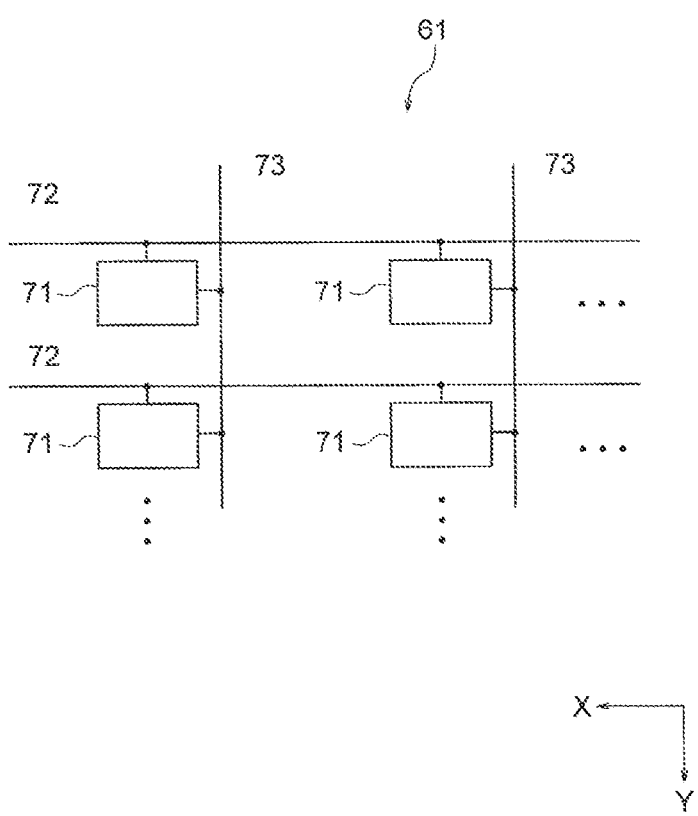
FIG. 9 is a diagram showing a schematic circuit configuration of a memory cell array portion.

FIG. 9 is a diagram showing a schematic circuit configuration of the memory cell array portion 61. As shown in FIG. 9, a plurality of memory cells 71 are arranged in the memory cell array portion 61 in a two-dimensional pattern. Each memory cell 71 is arranged in a vicinity of an intersection of a memory cell drive wiring 72 and a memory cell read wiring 73. Alternatively, the memory cells 71 may be arranged in a three-dimensional pattern. In this case, the plurality of memory cells 71 are arranged in the X direction, the Y direction, and the Z direction.

As the memory cell 71, for example, a ReRAM (Resistive Random Access Memory), a PCM (Phase Change Memory), an MRAM (Magneto resistive Random Memory), an FeRAM (Ferroelectric Random Access Memory), and the like can be applied. Alternatively, the memory cell 71 may be an SRAM (Static Random Access Memory) or a non-volatile memory.

A memory value (for example, +1, −1, or 0.5) is stored in the memory cell 71. The memory cell array portion 61 is configured to multiply the memory value of each memory cell 71 by a signal value of the memory cell control signal S61 which is input as an input signal from the CIM input control circuit 62 via the memory cell drive wiring 72. Next, the memory cell array portion 61 is configured to sequentially add multiplication results in row units or column units through the memory cell read wiring 73. Accordingly, a convolution signal S62 of a digital system indicating a result of a sum-of-product computation is read to the CIM readout circuit 63. Alternatively, the memory cell array portion 61 may be configured to collectively add the multiplication results.

When the convolution signal S62 is of an analog system, after the input signal via the memory cell drive wiring 72 and the memory value are multiplied, electric charges area added on the memory cell read wiring 73 and the convolution signal S62 are read to the CIM readout circuit 63. At this point, the input signal can be collectively input to all of the memory cell drive wirings 72 and, when the CIM readout circuit 63 is a column ADC, convolution signals S62 can be collectively read from all of the memory cell read wirings 73.

The imaging apparatus 2 according to the present embodiment described above is also configured to subject the light signal S12 generated by the light source cell array portion 11 to sum-of-product computation by the pixel array portion 21 in a similar manner to the first embodiment. Therefore, sophisticated calculations can be realized at low power. Furthermore, the imaging apparatus 2 according to the present embodiment includes the memory cell array portion 61 configured to further perform a sum-of-product computation on a computation result of the pixel array portion 21. Therefore, even more sophisticated calculations can be performed.

Third Embodiment

FIGS. 10A to 10D are diagrams showing a structure of an imaging apparatus according to the third embodiment. Similar constituent elements to those in the embodiments described above will be designated by the same reference signs and detailed descriptions thereof will be omitted. In an imaging apparatus 3a shown in FIG. 10A, in contrast to an optical system having a single-layer structure in which all circuit elements are arranged on the first substrate 101, a pixel system has a two-layer structure in which a pixel substrate 211 and a pixel control substrate 221 are stacked on top of each other. The pixel substrate 211 and the pixel control substrate 221 are, for example, silicon substrates. The pixel substrate 211 is arranged on an intermediate layer between the first substrate 101 and the pixel control substrate 221 and the pixel control substrate 221 is arranged on a lowermost layer.

The pixel array portion 21 is arranged on the pixel substrate 211. For example, any of the pixel 50a (refer to FIG. 5B), the pixel 50b (refer to FIG. 5C), and the pixel 50d (refer to FIG. 5E) described in the first embodiment are arranged in the pixel array portion 21 in a two-dimensional pattern.

On the other hand, the pixel control circuit 22, the pixel signal processing circuit 23, and the pixel logic circuit 25 are arranged on the pixel control substrate 221. The second substrate 201 shown in FIG. 2A or the pixel substrate 211 and the pixel control substrate 221 shown in FIG. 10B respectively correspond to the second substrate group. In other words, the second substrate group may be a single substrate or a plurality of substrates.

Note that the pixel substrate 211 and the pixel control substrate 221 are bonded via a through electrode or a connection terminal in a similar manner to the light source substrate 111 and the light source control substrate 121. The pixel control signal S21 and the pixel signal S22 are transmitted through the through electrode or the connection terminal.

Figure 10A:
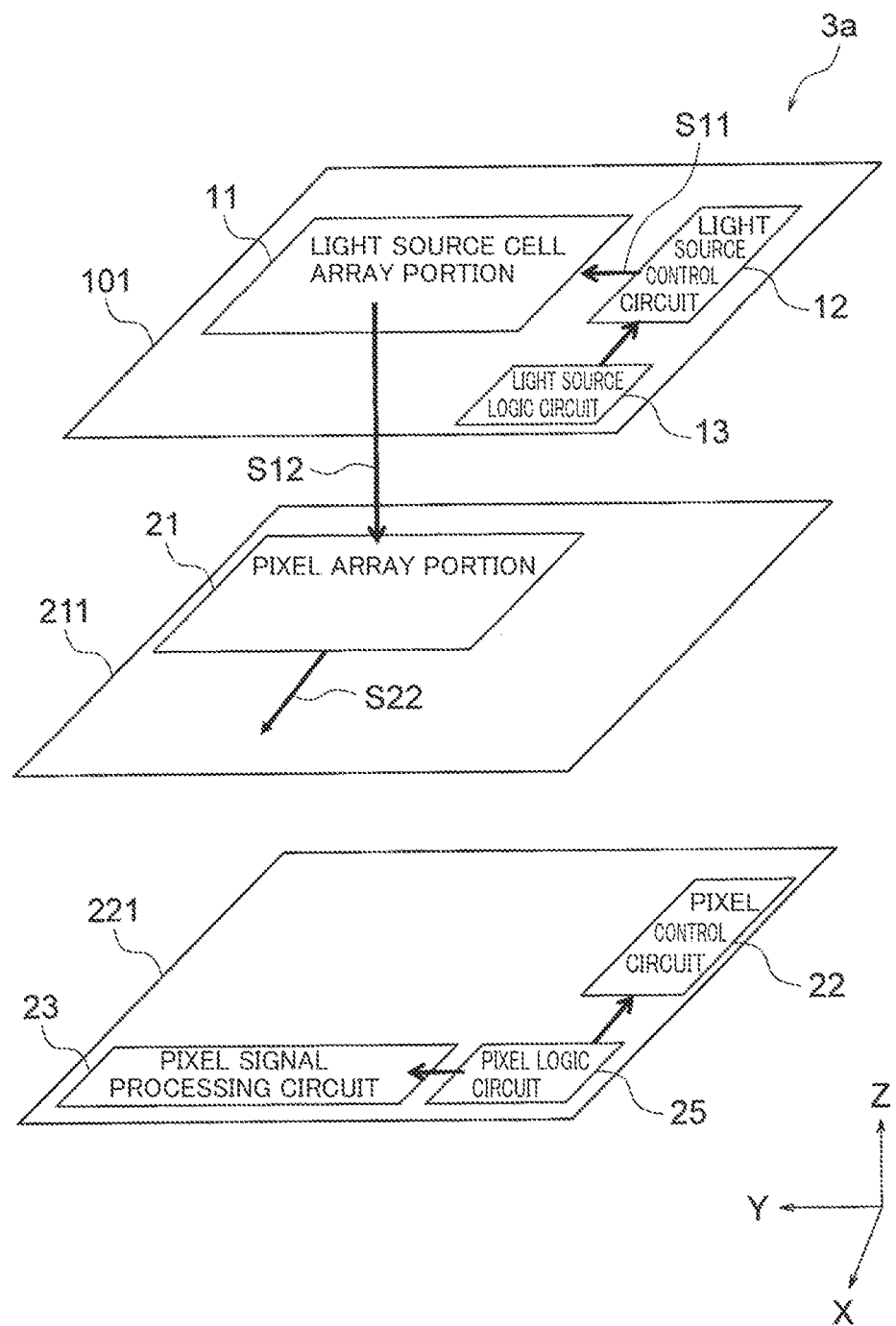
FIG. 10A is a diagram showing a structure of an imaging apparatus according to a third embodiment.
Figure 10B:
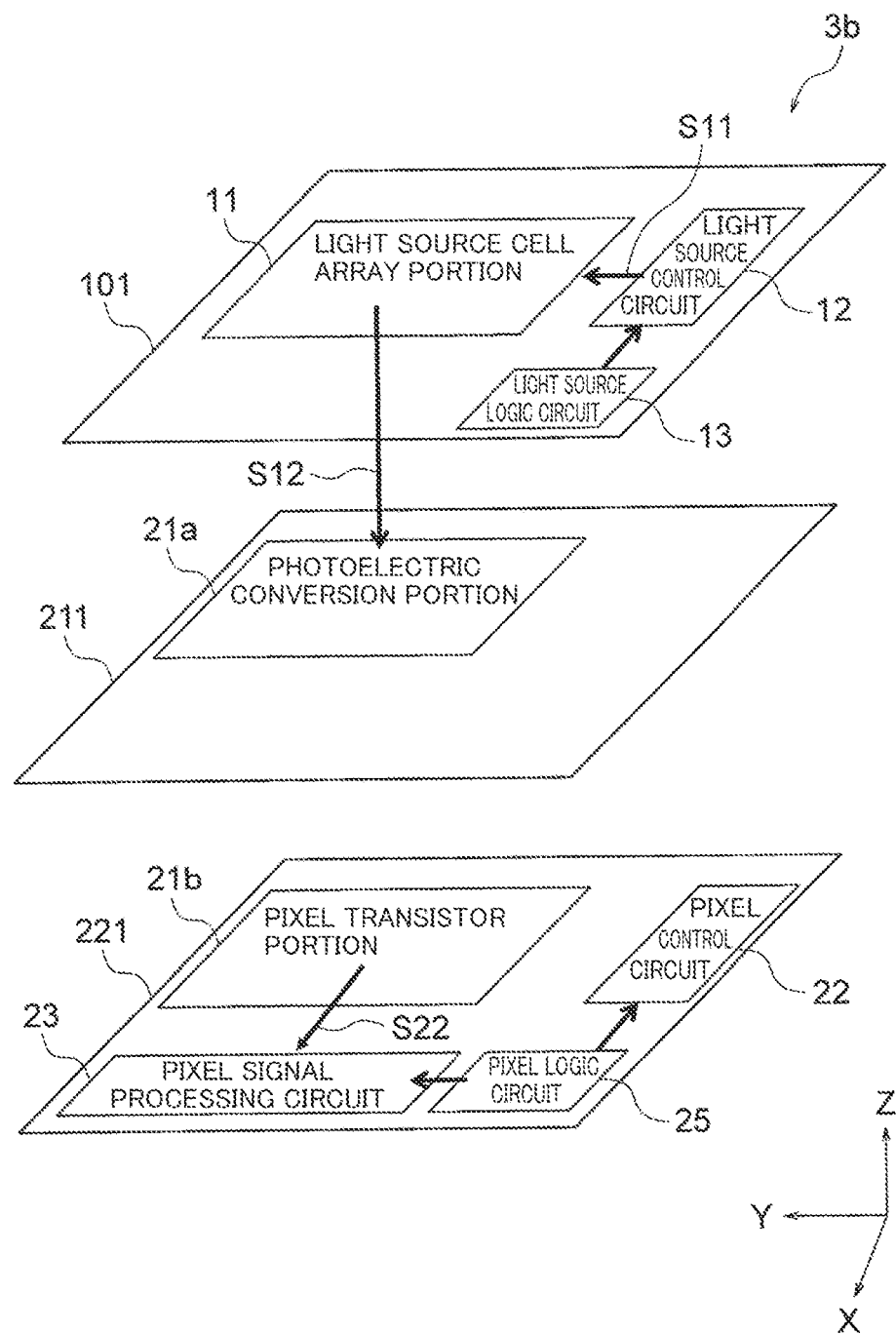
FIG. 10B is a diagram showing a structure of the imaging apparatus according to the third embodiment.

In the imaging apparatus 3b shown in FIG. 10B, the pixel array portion 21 is arranged in a distributed manner on the pixel substrate 211 and the pixel control substrate 221. A photoelectric conversion portion 21a configured to photoelectrically convert the light signal S12 is arranged on the pixel substrate 211, and a pixel transistor portion 21b configured to subject the light signal S12 to a sum-of-product computation is arranged on the pixel control substrate 221. For example, the pixel 50c (refer to FIG. 5D) or the pixel 50e (refer to FIG. 5F) described in the first embodiment are arranged in the pixel array portion 21 in a two-dimensional pattern.

When the pixel 50c is arranged, the photodiode 51 and the amplifying transistor 54 are arranged on the pixel substrate 211 as the photoelectric conversion portion 21a. In addition, the reset transistor 53, the selective transistor 55, and the MOS transistor 59 are arranged on the pixel control substrate 221 as the pixel transistor portion 21b.

On the other hand, when the pixel 50e is arranged, the logarithmic transformation circuit 510 is arranged on the pixel substrate 211 as the photoelectric conversion portion 21a. In addition, the buffer circuit 520, the subtraction circuit 530, and the quantization circuit 540 are arranged on the pixel control substrate 221 as the pixel transistor portion 21b.

Figure 10C:
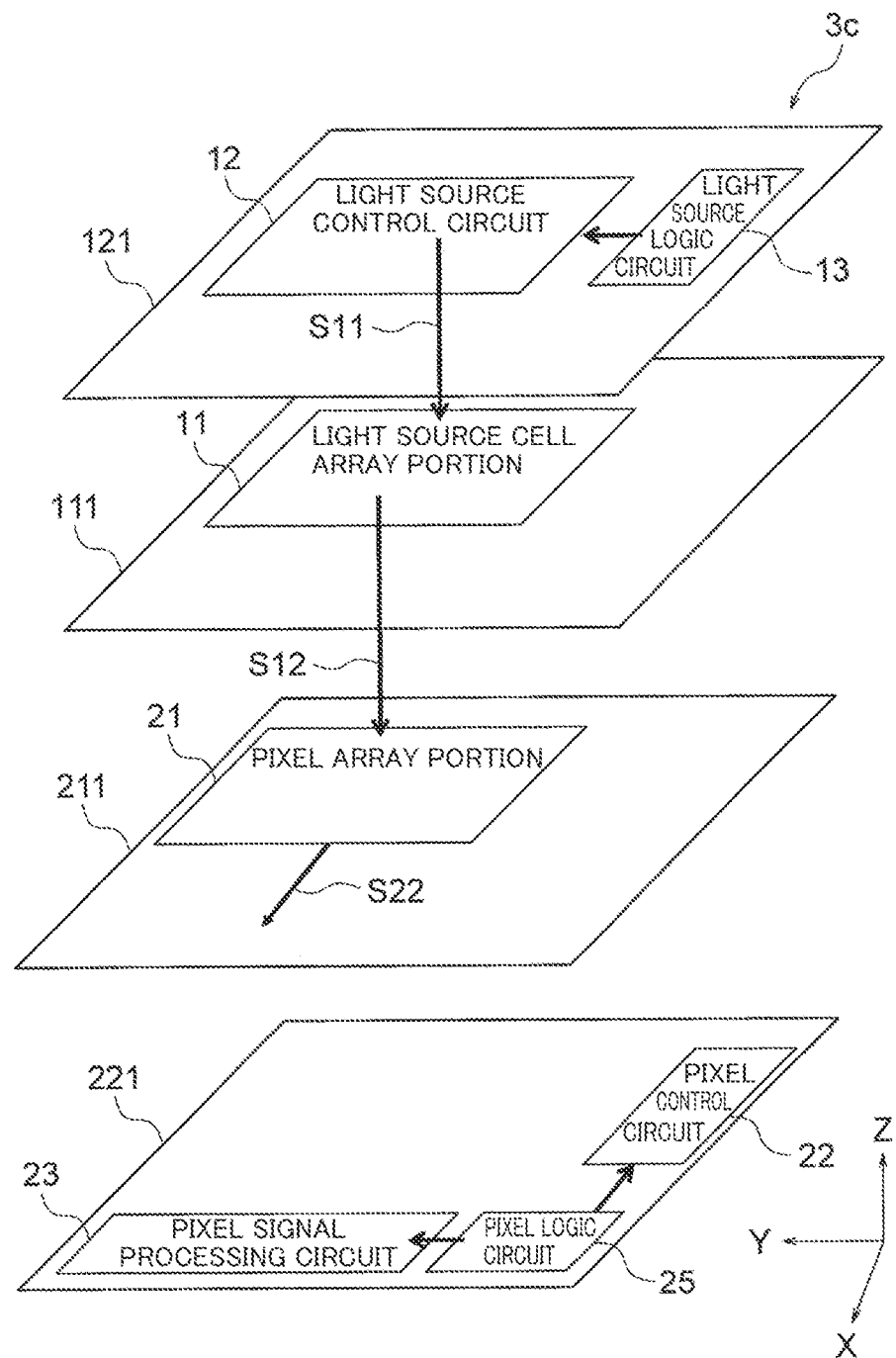
FIG. 10C is a diagram showing a structure of the imaging apparatus according to the third embodiment.

In the imaging apparatus 3c shown in FIG. 10C, both the optical system and the pixels have two-layer structures. In other words, in the optical system, the light source cell array portion 11 is arranged on the light source substrate 111 and the light source control circuit 12 and the light source logic circuit 13 are arranged on the light source control substrate 121. On the other hand, in the pixel system, in a similar manner to FIG. 10A, the pixel array portion 21 is arranged on the pixel substrate 211 and the pixel control circuit 22, the pixel signal processing circuit 23, and the pixel logic circuit 25 are arranged on the pixel control substrate 221.

Figure 10D:
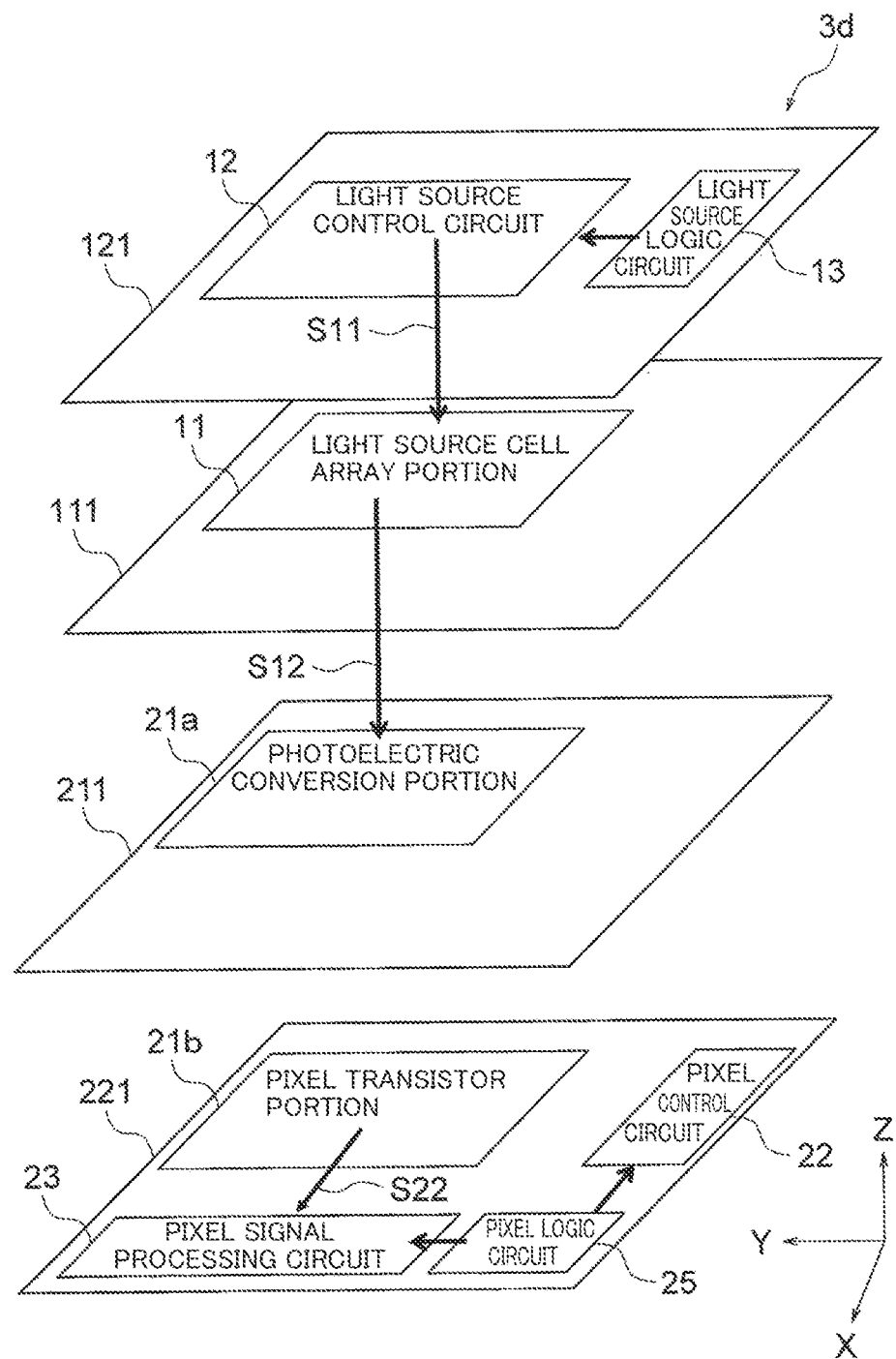
FIG. 10D is a diagram showing a structure of the imaging apparatus according to the third embodiment.

Similarly, in the imaging apparatus 3d shown in FIG. 10D, both the optical system and the pixels have two-layer structures. However, in the pixel system in FIG. 10D, among the pixel array portion 21, the photoelectric conversion portion 21a is arranged on the pixel substrate 211 and the pixel transistor portion 21b is arranged on the pixel control substrate 221 in a similar manner to FIG. 10B.

The imaging apparatus 3 according to the present embodiment described above is also configured to subject the light signal S12 generated by the light source cell array portion 11 to sum-of-product computation by the pixel array portion 21 in a similar manner to the first embodiment. Therefore, sophisticated calculations can be realized at low power. Furthermore, in the present embodiment, the pixel system has a two-layer structure. Therefore, an arrangement area of the pixel array portion 21 or, in other words, a sum-of-product computation area can be expanded. Accordingly, even more sophisticated calculations can be realized.

Note that the imaging apparatus 3 according to the present embodiment may also be provided with the shutter 102 (refer to FIG. 2C) and the black mask 103 (refer to FIG. 2D) in a similar manner to the first embodiment. In addition, the imaging apparatus 3 may be housed inside the package 104 (refer to FIG. 2E) with a light-shielding property.

Fourth Embodiment

FIGS. 11A to 11D are diagrams showing a structure of an imaging apparatus according to the fourth embodiment. Similar constituent elements to those in the embodiments described above will be designated by the same reference signs and detailed descriptions thereof will be omitted. In an imaging apparatus 4a shown in FIG. 11A, the memory substrate 202 is arranged on a layer below the pixel control substrate 221 of the imaging apparatus 3a (refer to FIG. 10A) according to the third embodiment described above. The memory cell array portion 61, the CIM input control circuit 62, CIM readout circuit 63, and the CIM logic circuit 64 are arranged on the memory substrate 202 in a similar manner to the second embodiment.

Figure 11A:
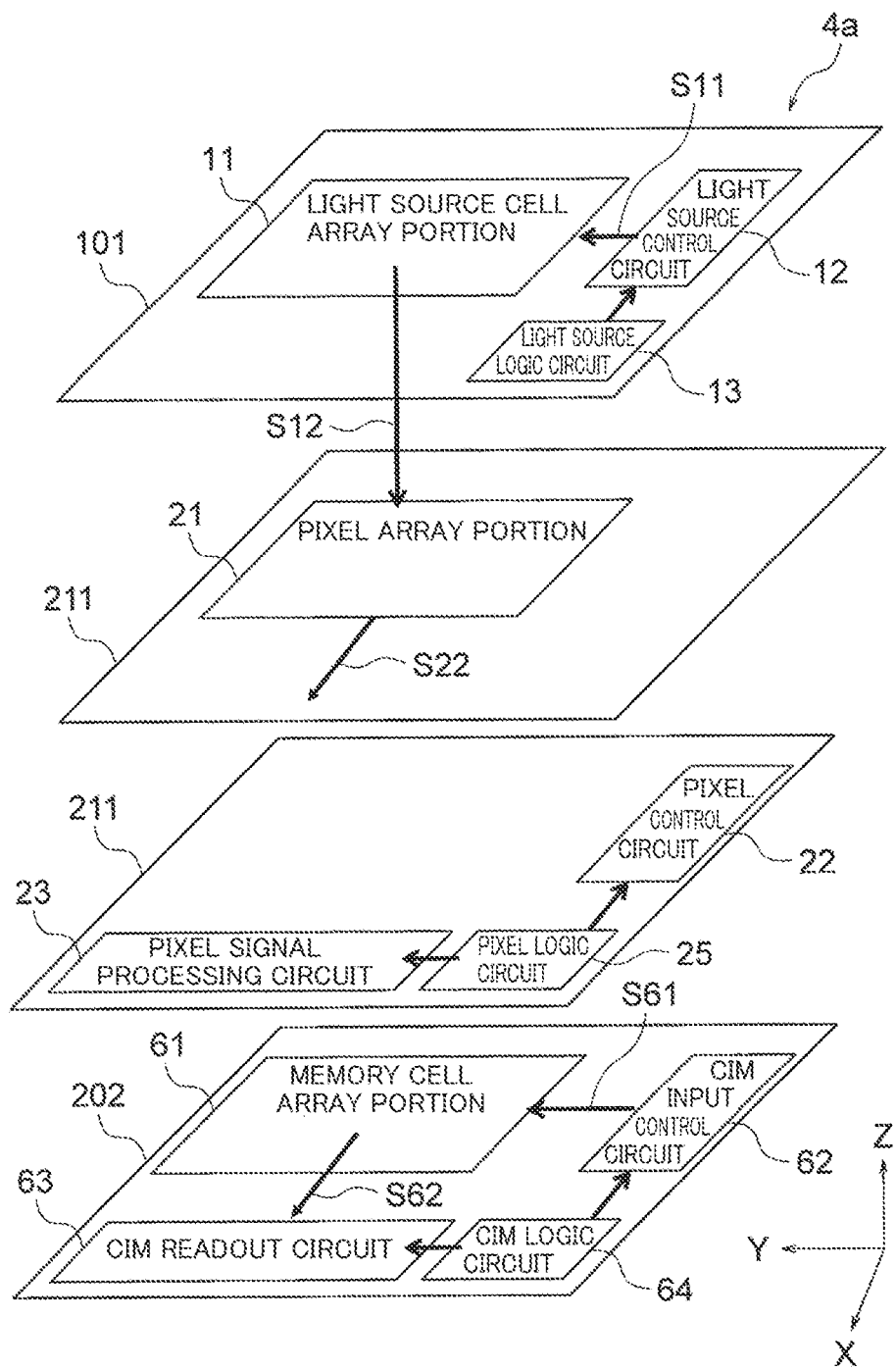
FIG. 11A is a diagram showing a structure of an imaging apparatus according to a fourth embodiment.
Figure 11B:
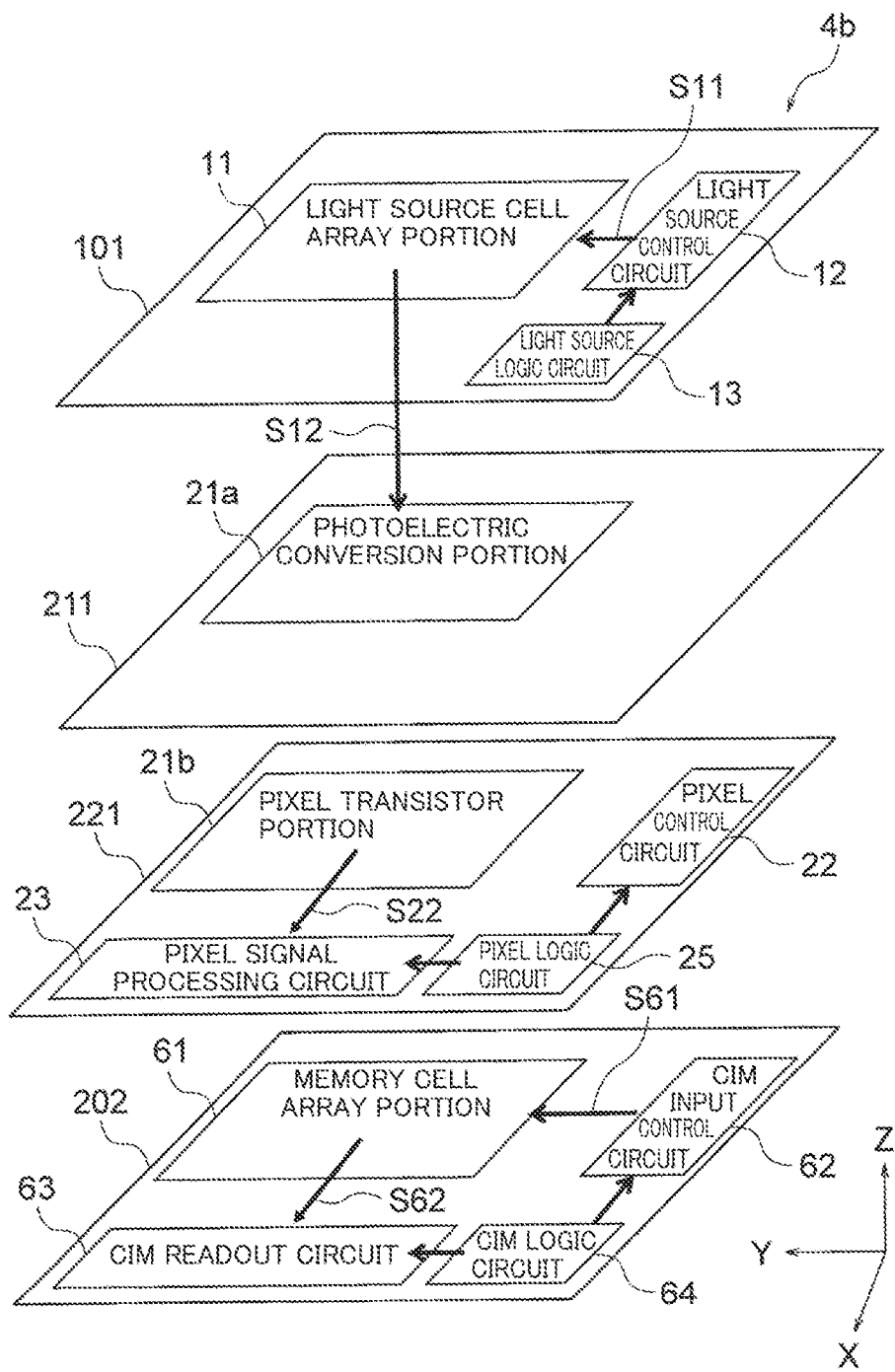
FIG. 11B is a diagram showing a structure of the imaging apparatus according to the fourth embodiment.

In an imaging apparatus 4b shown in FIG. 11B, the memory substrate 202 is arranged on a layer below the pixel control substrate 221 of the imaging apparatus 3b (refer to FIG. 10B) according to the third embodiment described above. The memory cell array portion 61, the CIM input control circuit 62, CIM readout circuit 63, and the CIM logic circuit 64 are arranged on the memory substrate 202 in a similar manner to the second embodiment.

Figure 11C:
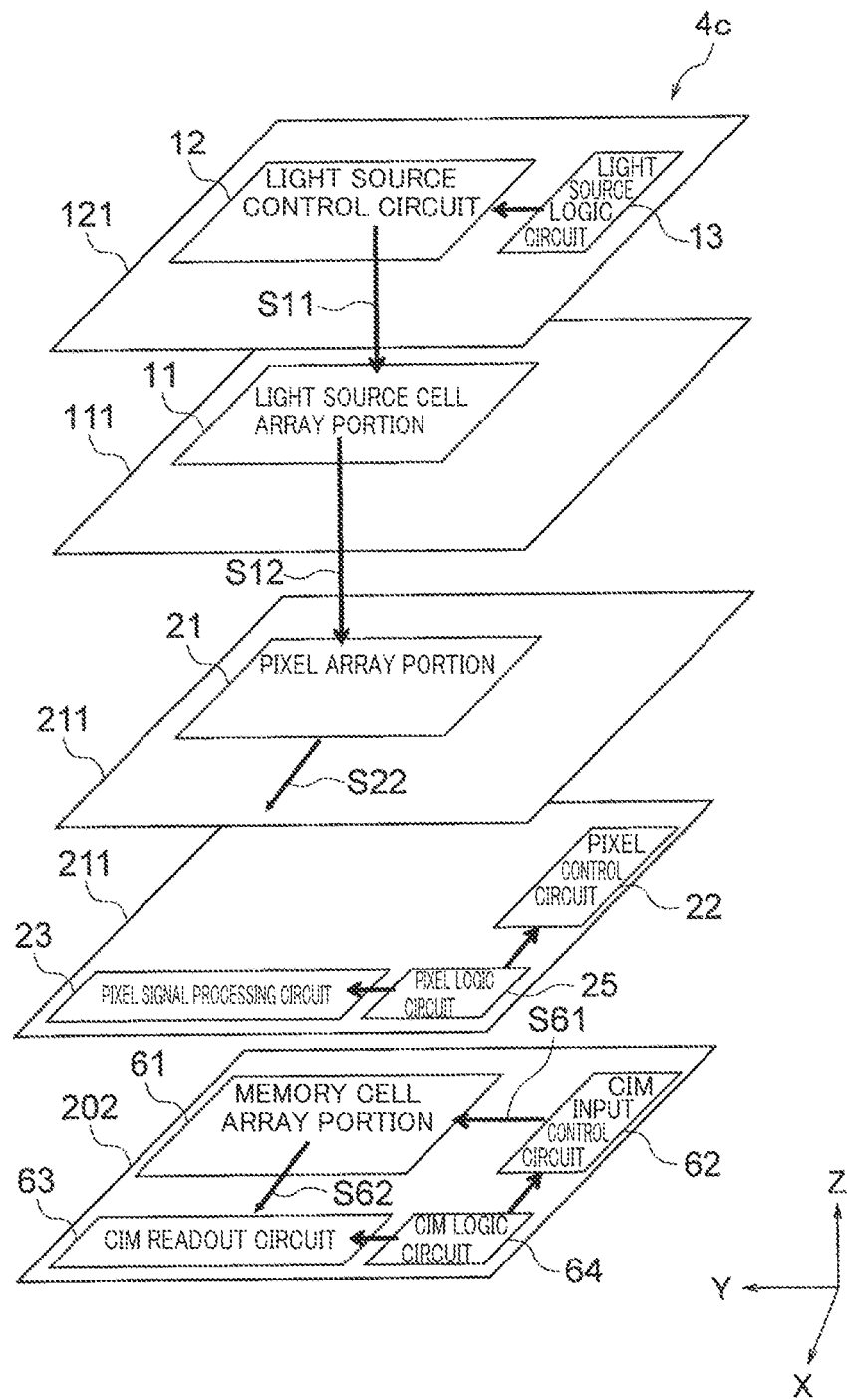
FIG. 11C is a diagram showing a structure of the imaging apparatus according to the fourth embodiment.

In an imaging apparatus 4c shown in FIG. 11C, the memory substrate 202 is arranged on a layer below the pixel control substrate 221 of the imaging apparatus 3c (refer to FIG. 10C) according to the third embodiment described above. The memory cell array portion 61, the CIM input control circuit 62, CIM readout circuit 63, and the CIM logic circuit 64 are arranged on the memory substrate 202 in a similar manner to the second embodiment.

Figure 11D:
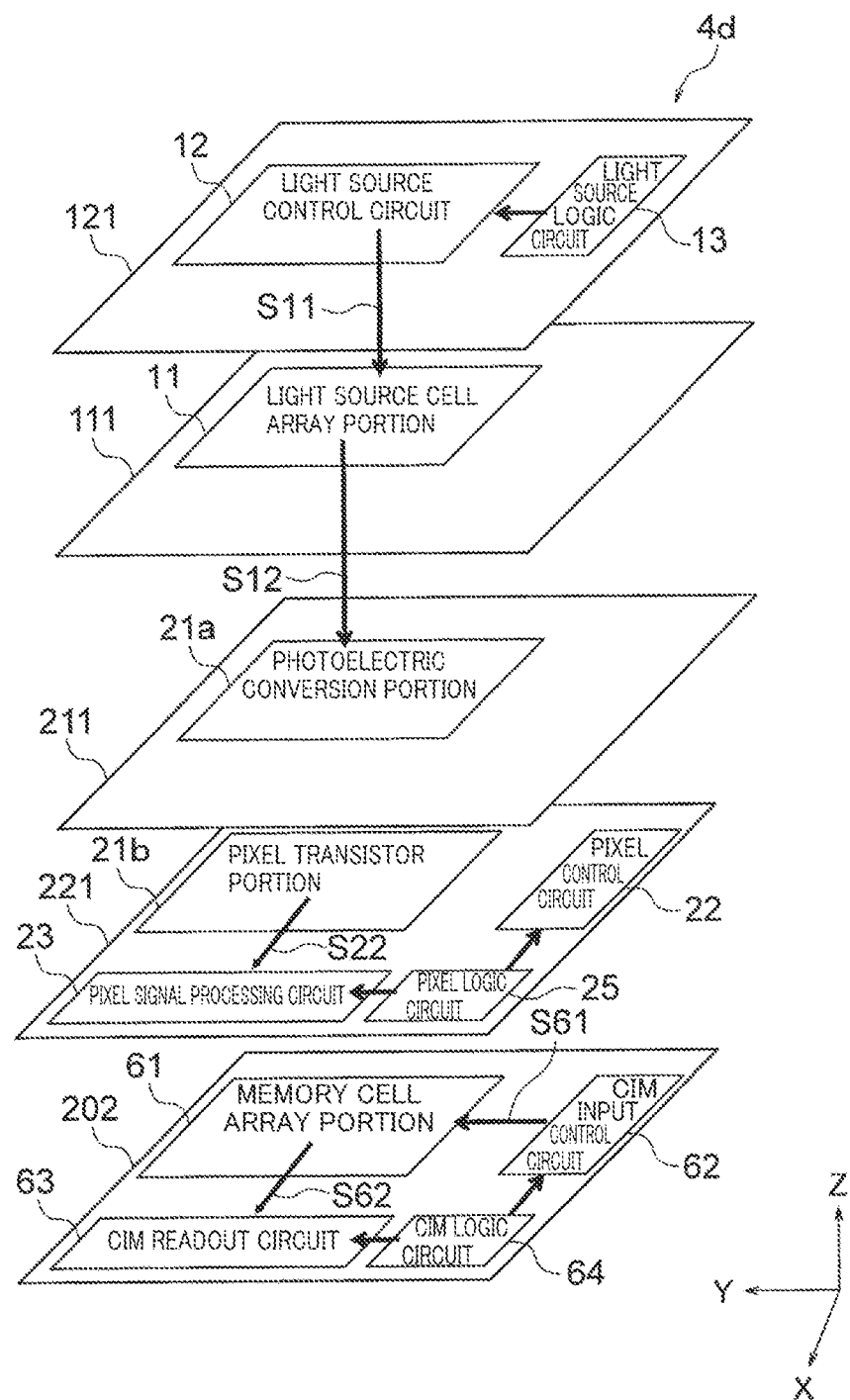
FIG. 11D is a diagram showing a structure of the imaging apparatus according to the fourth embodiment.

In an imaging apparatus 4d shown in FIG. 11D, the memory substrate 202 is arranged on a layer below the pixel control substrate 221 of the imaging apparatus 3d (refer to FIG. 10D) according to the third embodiment described above. The memory cell array portion 61, the CIM input control circuit 62, CIM readout circuit 63, and the CIM logic circuit 64 are arranged on the memory substrate 202 in a similar manner to the second embodiment.

The imaging apparatus 4 according to the present embodiment described above is also configured to subject the light signal 812 generated by the light source cell array portion 11 to sum-of-product computation by the pixel array portion 21 in a similar manner to the first embodiment. Therefore, sophisticated calculations can be realized at low power. Furthermore, the imaging apparatus 4 according to the present embodiment also includes, in a similar manner to the second embodiment, the memory cell array portion 61 configured to further perform a sum-of-product computation on a computation result of the pixel array portion 21. Therefore, even more sophisticated calculations can be performed.

Fifth Embodiment

Figure 12:
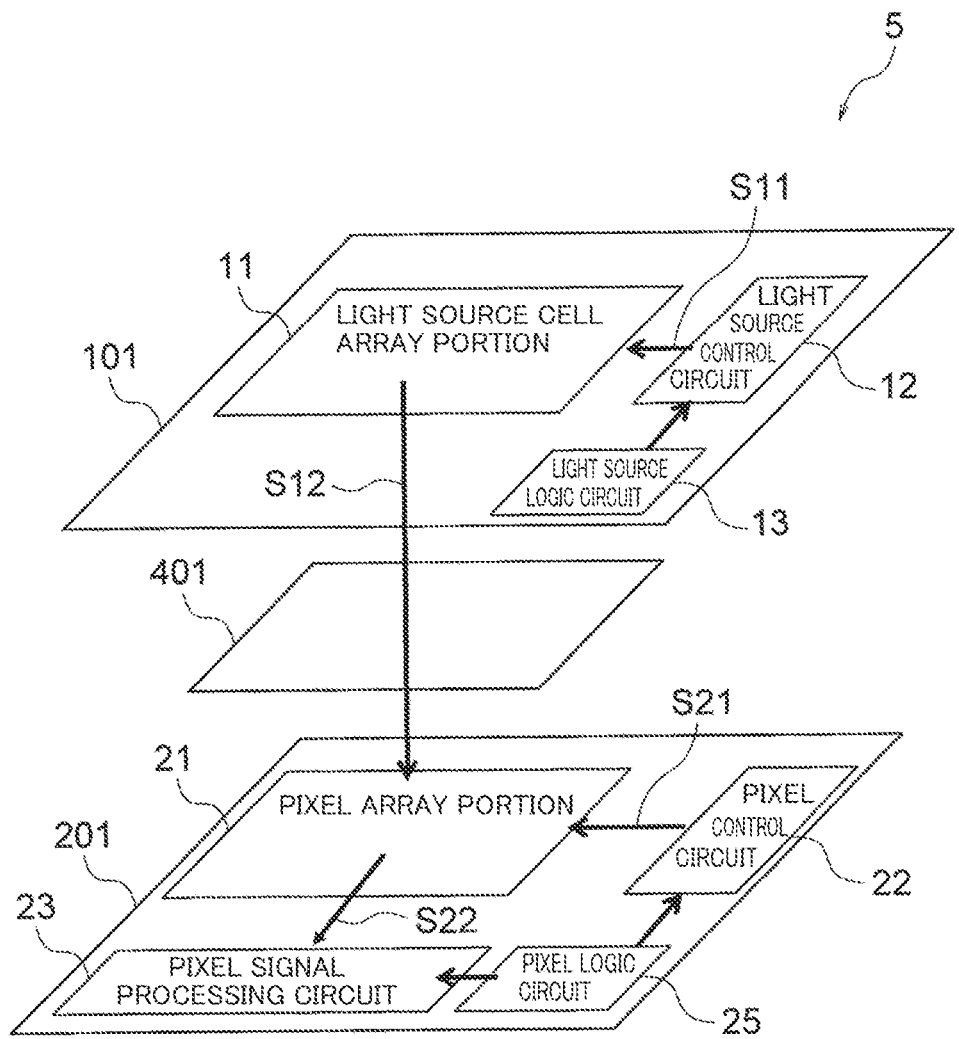
FIG. 12 is a diagram showing a structure of an imaging apparatus according to a fifth embodiment.
Figure 12:
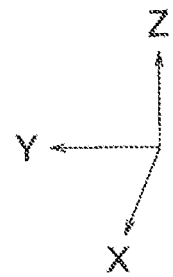

FIG. 12 is a diagram showing a structure of an imaging apparatus according to the fifth embodiment. Similar constituent elements to those in the embodiments described above will be designated by the same reference signs and detailed descriptions thereof will be omitted.

In an imaging apparatus 5 shown in FIG. 12, an optical modulation element 401 is provided between the light source cell array portion 11 and the pixel array portion 21. In the optical modulation element 401, a plurality of light signals S12 incident from the light source cell array portion 11 interfere with each other. Due to the interference, a sum-of-product computation is performed not only in the pixel array portion 21 but also in a light area.

According to the present embodiment described above, by arranging the optical modulation element 401 between the light source cell array portion 11 and the pixel array portion 21, a sum-of-product computation can be additionally performed in the light area. Therefore, an even more sophisticated sum-of-product computation can be performed.

Note that the present embodiment can also be applied to the other embodiments described above. In other words, in the respective imaging apparatuses according to the first to fourth embodiments, the optical modulation element 401 may be provided between the light source cell array portion 11 and the pixel array portion 21.

Sixth Embodiment

Figure 13:
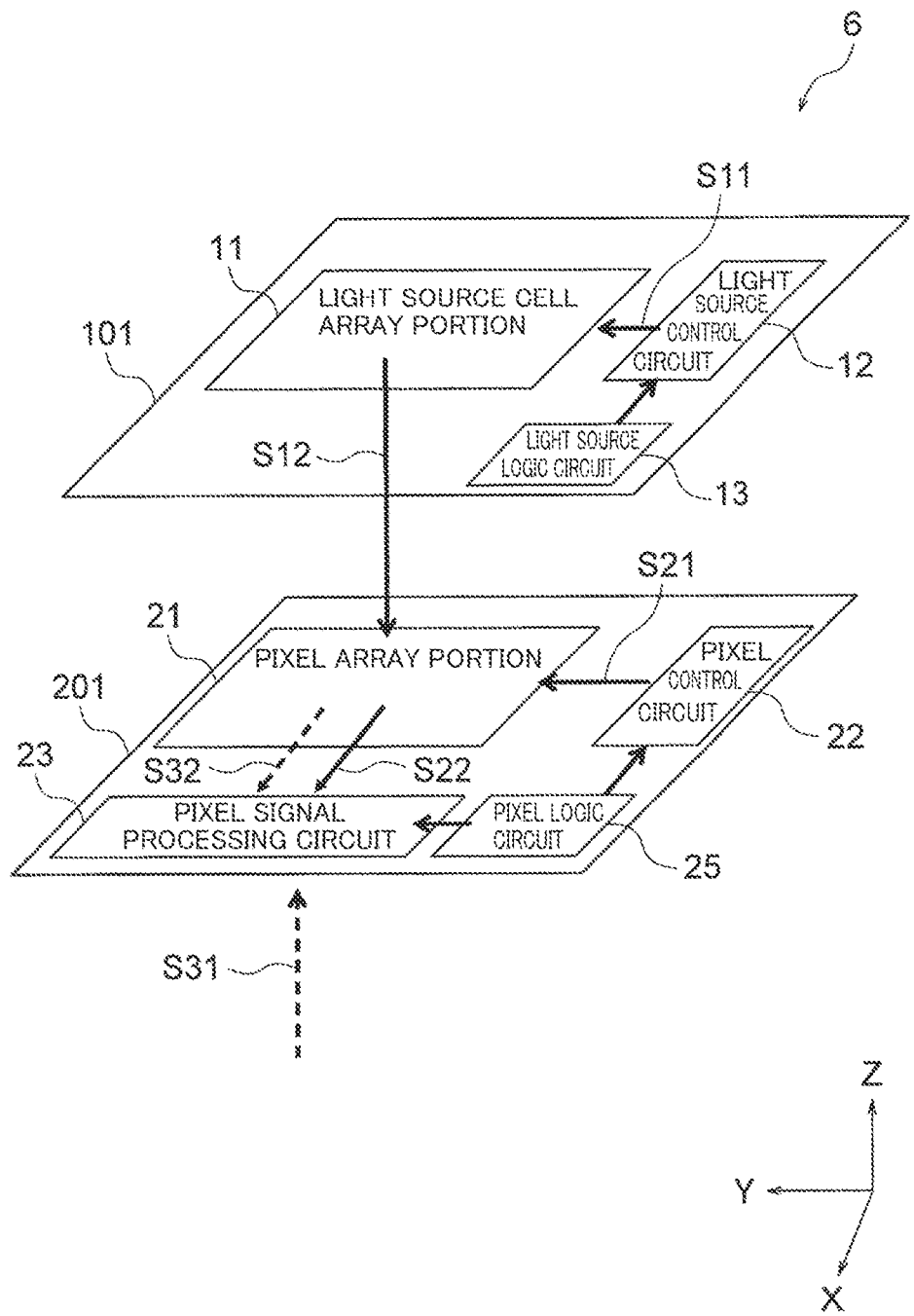
FIG. 13 is a diagram showing a structure of an imaging apparatus according to a sixth embodiment.

FIG. 13 is a diagram showing a structure of an imaging apparatus according to a sixth embodiment. Similar constituent elements to those in the embodiments described above will be designated by the same reference signs and detailed descriptions thereof will be omitted.

In an imaging apparatus 6 according to the present embodiment, reflected light S31 reflected by a subject is incident to the pixel array portion 21 in addition to the light signal S12. The light signal S12 is incident from the light source cell array portion 11 arranged above the pixel array portion 21. The reflected light S31 is incident from an opposite direction to the light signal S12 or, in other words, from below the pixel array portion 21.

When the pixel array portion 21 receives the light signal S12, the pixel array portion 21 is configured to perform a sum-of-product computation based on the light signal S12 and output the pixel signal S22 to the pixel signal processing circuit 23. In addition, when the pixel array portion 21 receives the reflected light S31, the pixel array portion 21 is configured to output the pixel signal S32 obtained by photoelectrically converting the reflected light S31 to the pixel signal processing circuit 23. In this case, an image signal of the subject is generated in the pixel signal processing circuit 23.

According to the present embodiment described above, not only a sum-of-product computation function but an imaging function can also be realized. Note that the present embodiment can also be applied to the first and third embodiments described above.

Seventh Embodiment

Figure 14:
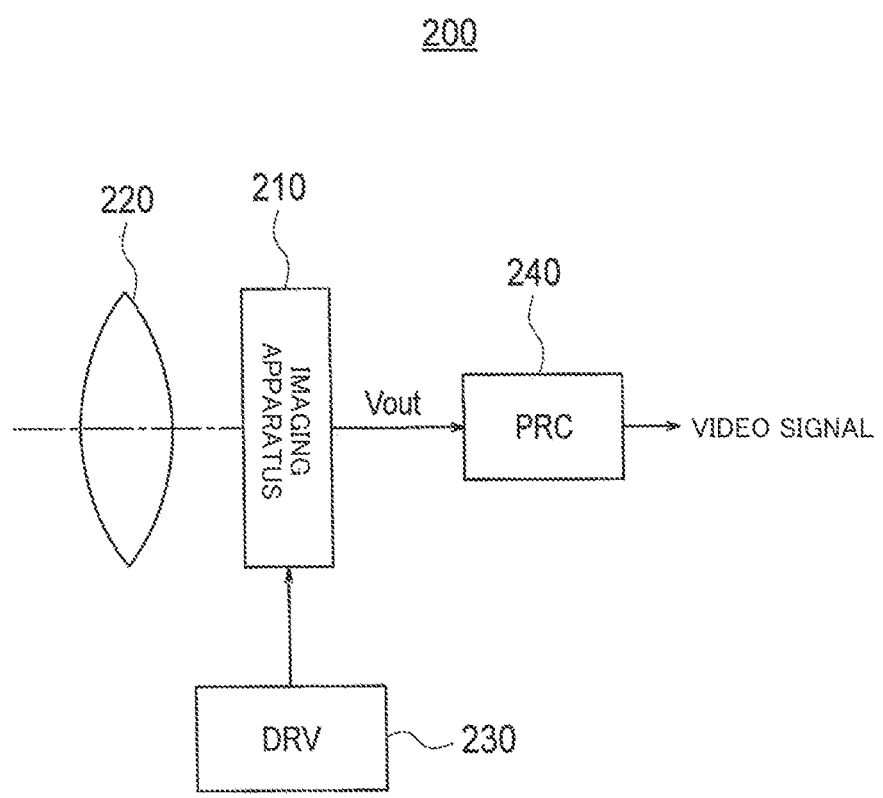
FIG. 14 is a diagram showing an example of a configuration of an electronic device according to a seventh embodiment.

FIG. 14 is a diagram showing an example of a configuration of an electronic device according to a seventh embodiment. As shown in FIG. 14, an electronic device 200 according to the present embodiment is a camera system and includes an imaging apparatus 210, a lens 220, a drive circuit (DRV) 230, and a signal processing circuit (PRC) 240.

Any of the imaging apparatuses according to the first embodiment, the third embodiment, and the sixth embodiment described above can be applied to the imaging apparatus 210. The lens 220 focuses incident light (image light) on an imaging plane.

The drive circuit 230 includes a timing generator configured to generate various timing signals including a start pulse and a clock block for driving circuits inside the imaging apparatus 210 and is configured to drive the imaging apparatus 210 with a predetermined timing signal. The signal processing circuit 240 performs predetermined signal processing with respect to an output signal of the imaging apparatus 210. An image signal processed by the signal processing circuit 240 is recorded in, for example, a recording medium such as a memory. A hard copy of the image information recorded in the recording medium is made by a printer or the like. In addition, the image signal processed by the signal processing circuit 240 is shown as a moving image on a monitor constituted of a liquid crystal display or the like.

According to the present embodiment described above, by mounting the imaging apparatuses according to the respective embodiments described above as the imaging apparatus 210 in the electronic device 200 that is a digital still camera or the like, a high accuracy imaging function can be realized.

<Application to Mobile Object>

The technique according to the present disclosure (the present technique) can be applied to various products. For example, the technique according to the present disclosure may be implemented as an apparatus mounted in any type of mobile object such as an automobile, an electric automobile, a hybrid electric automobile, a motorbike, a bicycle, a personal mobility, an airplane, a drone, a ship, and a robot.

Figure 15:
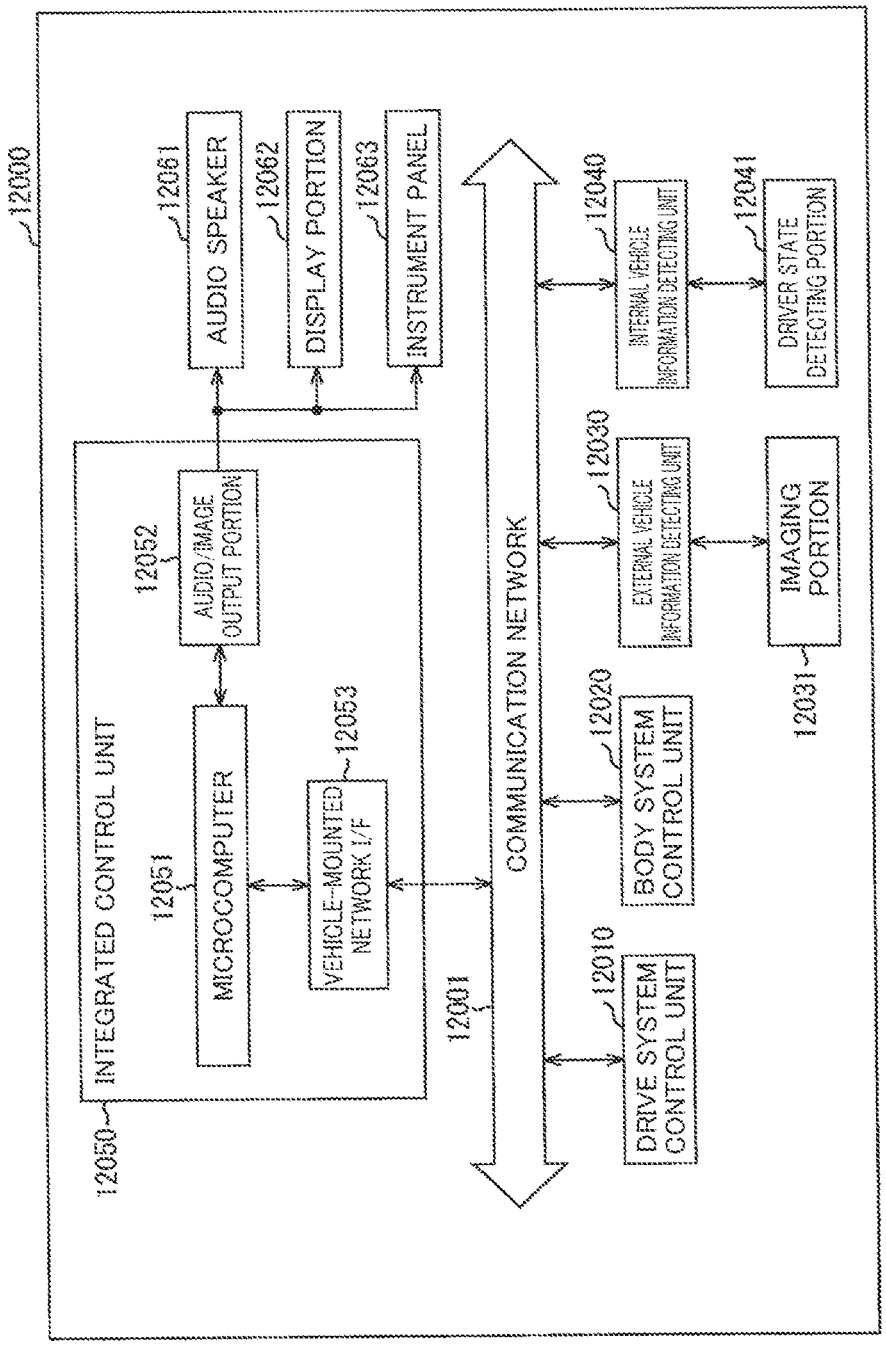
FIG. 15 is a block diagram showing an example of a schematic configuration of a vehicle control system.

FIG. 15 is a block diagram showing a schematic configuration example of a vehicle control system that is an example of a moving body control system to which the technique according to the present disclosure can be applied.

A vehicle control system 12000 includes a plurality of electronic control units connected to each other via a communication network 12001. In an example shown in FIG. 15, the vehicle control system 12000 includes a drive system control unit 12010, a body system control unit 12020, an external vehicle information detecting unit 12030, an internal vehicle information detecting unit 12040, and an integrated control unit 12050. In addition, as functional components of the integrated control unit 12050, a microcomputer 12051, an audio/image output portion 12052, and a vehicle-mounted network I/F (interface) 12053 are shown in the drawing.

The drive system control unit 12010 controls an operation of an apparatus related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control apparatus such as a braking apparatus that generates a braking force of a vehicle.

The body system control unit 12020 controls operations of various apparatuses equipped in a vehicle body in accordance with various programs. For example, the body system control unit 12020 functions as a control apparatus of a keyless entry system, a smart key system, a power window apparatus, or various lamps such as a head lamp, a back lamp, a brake lamp, a turn signal, or a fog lamp. In this case, radio waves transmitted from a portable device that substitutes for a key or signals of various switches can be input to the body system control unit 12020. The body system control unit 12020 receives inputs of these radio waves or signals and controls a door lock apparatus, a power window apparatus, a lamp, and the like of the vehicle.

The external vehicle information detecting unit 12030 detects information on the outside of the vehicle having the vehicle control system 12000 mounted thereon. For example, an imaging portion 12031 is connected to the external vehicle information detecting unit 12030. The external vehicle information detecting unit 12030 causes the imaging portion 12031 to capture an image outside the vehicle and receives the captured image. The external vehicle information detecting unit 12030 may perform object detection processing or distance detection processing for people, cars, obstacles, signs, and letters on a road on the basis of the received image.

The imaging portion 12031 is an optical sensor that receives light and outputs an electrical signal according to the amount of received light. The imaging portion 12031 can also output the electrical signal as an image and output the electrical signal as ranging information. In addition, light received by the imaging portion 12031 may be visible light, or may be invisible light such as infrared light.

The internal vehicle information detecting unit 12040 detects information inside the vehicle. For example, a driver state detecting portion 12041 that detects a state of a driver is connected to the internal vehicle information detecting unit 12040. The driver state detecting portion 12041 includes, for example, a camera that captures an image of the driver, and the internal vehicle information detecting unit 12040 may calculate a degree of fatigue or concentration of the driver or may determine whether or not the driver is dozing on the basis of detection information input from the driver state detecting portion 12041.

The microcomputer 12051 can calculate a control target value of the driving force generation apparatus, the steering mechanism, or the braking apparatus on the basis of information inside and outside the vehicle acquired by the external vehicle information detecting unit 12030 or the internal vehicle information detecting unit 12040, and output a control command to the drive system control unit 12010. For example, the microcomputer 12051 can perform cooperative control for the purpose of realizing functions of an ADAS (advanced driver assistance system) including vehicle collision avoidance, impact mitigation, following traveling based on an inter-vehicle distance, vehicle speed maintenance driving, vehicle collision warning, vehicle lane deviation warning, and the like.

Further, the microcomputer 12051 can perform cooperative control for the purpose of automated driving or the like in which automated travel is performed without depending on operations of the driver by controlling the driving force generator, the steering mechanism, the braking apparatus, and the like on the basis of information regarding the surroundings of the vehicle acquired by the external vehicle information detecting unit 12030 or the internal vehicle information detecting unit 12040.

In addition, the microcomputer 12051 can output a control command to the body system control unit 12030 based on the information outside the vehicle acquired by the external vehicle information detecting unit 12030. For example, the microcomputer 12051 can perform cooperative control for the purpose of preventing glare by controlling the headlamp according to the position of a preceding vehicle or an oncoming vehicle detected by the external vehicle information detecting unit 12030 to switch from a high beam to a low beam or the like. The audio/image output portion 12052 transmits an output signal of at least one of audio and an image to an output apparatus capable of visually or audibly notifying a passenger or the outside of the vehicle of information. In the example shown in FIG. 15, as such an output apparatus, an audio speaker 12061, a display portion 12062 and an instrument panel 12063 are shown. The display portion 12062 may include, for example, at least one of an onboard display and a head-up display.

Figure 16:
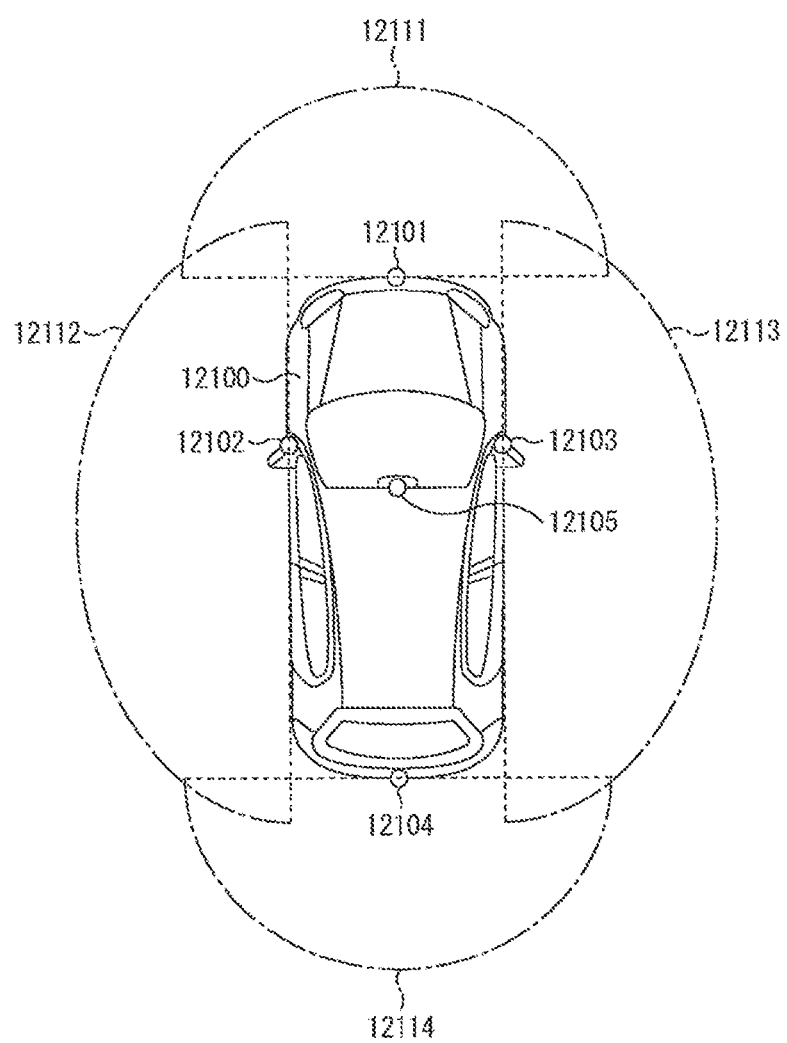
FIG. 16 is an explanatory diagram showing an example of installation positions of an external vehicle information detecting portion and an imaging portion.

FIG. 16 is a diagram showing an example of an installation position of the imaging portion 12031.

In FIG. 16, the imaging portion 12031 includes imaging portions 12101, 12102, 12103, 12104, and 12105.

The imaging portions 12101, 12102, 12103, 12104, and 12105 are provided at positions such as a front nose, side-view mirrors, a rear bumper, a back door, and an upper portion of a windshield in a vehicle interior of the vehicle 12100, for example. The imaging portion 12101 provided on the front nose and the imaging portion 12105 provided in the upper portion of the windshield in the vehicle interior mainly acquire images in front of the vehicle 12100. The imaging portions 12102 and 12103 provided on the side-view mirrors mainly acquire images on a lateral side of the vehicle 12100. The imaging portion 12104 provided on the rear bumper or the back door mainly acquires images behind the vehicle 12100. The imaging portion 12105 included in the upper portion of the windshield inside the vehicle is mainly used for detection of a preceding vehicle, a pedestrian, an obstacle, a traffic signal, a traffic sign, a lane, or the like.

FIG. 16 illustrates an example of imaging ranges of the imaging portions 12101 to 12104. An imaging range 12111 indicates an imaging range of the imaging portion 12101 provided at the front nose, imaging ranges 12112 and 12113 respectively indicate imaging ranges of the imaging portions 12102 and 12103 provided at the side-view mirrors, and an imaging range 12114 indicates an imaging range of the imaging portion 12104 provided at the rear bumper or the back door. For example, a bird's-eye view image of the vehicle 12100 as viewed from above can be obtained by superimposing pieces of image data captured by the imaging portions 12101 to 12104.

At least one of the imaging portions 12101 to 12104 may have a function for acquiring distance information. For example, at least one of the imaging portions 12101 to 12104 may be a stereo camera constituted of a plurality of imaging elements or may be an imaging element having pixels for phase difference detection.

For example, the microcomputer 12051 can extract, particularly, a closest three-dimensional object on a path on which the vehicle 12100 is traveling, which is a three-dimensional object traveling at a predetermined speed (for example, 0 km/h or higher) in the substantially same direction as the vehicle 12100, as a preceding vehicle by acquiring a distance to each of three-dimensional objects in the imaging ranges 12111 to 12114 and a temporal change in the distance (a relative speed with respect to the vehicle 12100) on the basis of distance information obtained from the imaging portions 12101 to 12104. Further, the microcomputer 12051 can set an inter-vehicle distance to be secured in advance in front of a preceding vehicle and can perform automated brake control (also including following stop control) or automated acceleration control (also including following start control). Thus, it is possible to perform cooperative control for the purpose of, for example, automated driving in which the vehicle travels in an automated manner without requiring the driver to perform operations.

For example, the microcomputer 12051 can classify and extract three-dimensional data regarding three-dimensional objects into two-wheeled vehicles, normal vehicles, large vehicles, pedestrians, electric poles and the like, and other three-dimensional objects based on distance information obtained from the imaging portions 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display portion 12062, forced deceleration and avoidance steering are performed through the drive system control unit 12010, and thus it is possible to perform driving support for collision avoidance.

At least one of the imaging portions 12101 to 12104 may be an infrared camera that detects infrared rays. For example, the microcomputer 12051 can recognize a pedestrian by determining whether there is a pedestrian in the captured image of the imaging portions 12101 to 12104. Such pedestrian recognition is performed by, for example, a procedure in which feature points in the captured images of the imaging portions 12101 to 12104 as infrared cameras are extracted and a procedure in which pattern matching processing is performed on a series of feature points indicating the outline of the object to determine whether or not the object is a pedestrian. When the microcomputer 12051 determines that there is a pedestrian in the captured images of the imaging portions 12101 to 12104, and the pedestrian is recognized, the audio/image output portion 12052 controls the display portion 12062 so that the recognized pedestrian is superimposed and displayed with a square contour line for emphasis. In addition, the audio/image output portion 12052 may control the display portion 12062 so that an icon indicating a pedestrian or the like is displayed at a desired position.

An example of the vehicle control system to which the technique according to the present disclosure can be applied has been described above. The technique according to the present disclosure may be applied to the imaging portion 12031 and the like among the above-described configurations. Specifically, the imaging apparatus described in the first, third, and sixth embodiments can be applied to the imaging portion 12031. By applying the technique according to the present disclosure to the imaging portion 12031, a clearer captured image can be obtained, and thus it is possible to reduce a driver's fatigue.

The present technique can also be configured as follows.

(1) An imaging apparatus, including:

a first substrate group in which is arranged a light source cell array portion configured to generate a light signal; and a second substrate group in which is arranged a pixel array portion configured to photoelectrically convert the light signal and output a pixel signal representing a result of a sum-of-product computation, wherein the first substrate group and the second substrate group are stacked so that at least a part of the light source cell array portion overlaps with the pixel array portion.

(2) The imaging apparatus according to (1), wherein the light source cell array portion includes a plurality of light source cells arranged in a two-dimensional pattern, the pixel array portion includes a plurality of pixels arranged in a two-dimensional pattern, and in the plurality of light source cells and the plurality of pixels, a center pitch of one is an integral multiple of a center pitch of the other.

(3) The imaging apparatus according to (1) or (2), wherein the light signal is infrared light or visible light.

(4) The imaging apparatus according to any one of (1) to (3), wherein the first substrate group includes:

a light source substrate on which the light source cell array portion is arranged; and a light source control substrate which is stacked below the light source substrate and on which a light source control circuit configured to control drive of the light source cell array portion is arranged.

(5) The imaging apparatus according to any one of (1) to (4), wherein
the second substrate group includes:
a substrate on which the pixel array portion is arranged; and
a memory substrate which is stacked below the substrate and on which is arranged a memory cell array portion configured to output a convolution signal representing a result of a sum-of-product computation of an input signal based on the pixel signal.

(6) The imaging apparatus according to (5), wherein at least one of the pixel signal and the convolution signal is an analog signal.

(7) The imaging apparatus according to (6), further including a CIM readout circuit configured to process the convolution signal read from the memory cell array portion.

(8) The imaging apparatus according to (6) or (7), further including a pixel signal processing circuit configured to process the pixel signal read from the pixel array portion.

(9) The imaging apparatus according to (8), wherein the pixel signal processing circuit is arranged on a same substrate as the pixel array portion.

(10) The imaging apparatus according to (8), wherein the pixel signal processing circuit is arranged on a different substrate from the pixel array portion.

(11) The imaging apparatus according to any one of (1) to (10), wherein
the pixel array portion includes a photoelectric conversion portion configured to photoelectrically convert the light signal and a pixel transistor portion configured to subject the light signal to a sum-of-product computation, and
the photoelectric conversion portion is arranged on a different substrate from the pixel transistor portion.

(12) The imaging apparatus according to any one of (1) to (11), further including an optical modulation element arranged between the light source cell array portion and the pixel array portion.

(13) The imaging apparatus according to any one of (1) to (11), further including a shutter arranged between the light source cell array portion and the pixel array portion.

(14) The imaging apparatus according to any one of (1) to (11), further including a black mask provided on an edge of the first substrate group and an edge of the second substrate group.

(15) The imaging apparatus according to any one of (1) to (11), wherein the first substrate group and the second substrate group are housed in a light-shielding package.

(16) The imaging apparatus according to (2), wherein each of the plurality of light source cells includes a light-emitting element, an active element configured to independently control the light-emitting element, and a storage portion provided between the light-emitting element and the active element.

(17) The imaging apparatus according to (16), wherein the storage portion is configured to store data related to the sum-of-product computation.

(18) The imaging apparatus according to (1), wherein the pixel array portion is configured to receive, in a direction opposite to the light signal, reflected light having been reflected by a subject.

(19) An electronic device, including an imaging apparatus including: a first substrate group in which is arranged a light source cell array portion configured to generate a light signal; and a second substrate group in which is arranged a pixel array portion configured to photoelectrically convert the light signal and output a pixel signal representing a result of a sum-of-product computation, wherein the first substrate group and the second substrate group are stacked so that at least a part of the light source cell array portion overlaps with the pixel array portion.

(20) A signal processing method, including the steps of:
generating a light signal with a light source cell array portion arranged in a first substrate group; and
photoelectrically converting the light signal and outputting a pixel signal representing a result of a sum-of-product computation with a pixel array portion which overlaps with at least a part of the light source cell array portion.

REFERENCE SIGNS LIST 1 to 6 Imaging apparatus
11 Light source cell array portion
21 Pixel array portion
21a Photoelectric conversion portion
21b Pixel transistor portion
23 Pixel signal processing circuit
30 Light source cell
50 Pixel
63 CIM readout circuit
101 First substrate
102 Shutter
103 Black mask
104 Package
111 Light source substrate
121 Light source control substrate
201 Second substrate
202 Memory substrate
300 Light-emitting element
310 Active element
320 Storage portion
401 Optical modulation element

The invention claimed is:
1. An imaging apparatus, comprising:
a first substrate group in which is arranged a light source cell array portion configured to generate a light signal, wherein the light signal is visible light; and
a second substrate group in which is arranged a pixel array portion configured to photoelectrically convert the light signal and output a pixel signal representing a result of a sum-of-product computation,
wherein the first substrate group and the second substrate group are stacked so that at least a part of the light source cell array portion overlaps with the pixel array portion, and
wherein the sum-of-product computation includes sums of products of the photoelectrically converted light signal and a corresponding coefficient for each pixel.

2. The imaging apparatus according to claim 1, wherein
the light source cell array portion includes a plurality of light source cells arranged in a two-dimensional pattern,
the pixel array portion includes a plurality of pixels arranged in a two-dimensional pattern, and
in the plurality of light source cells and the plurality of pixels, a center pitch of one is an integral multiple of a center pitch of the other.

3. The imaging apparatus according to claim 2, wherein each of the plurality of light source cells includes a light-emitting element, an active element configured to independently control the light-emitting element, and a storage portion provided between the light-emitting element and the active element.

4. The imaging apparatus according to claim 3, wherein the storage portion is configured to store data related to the sum-of-product computation.

5. The imaging apparatus according to claim 1, wherein the first substrate group includes:
a light source substrate on which the light source cell array portion is arranged; and
a light source control substrate which is stacked on top of the light source substrate and on which a light source control circuit configured to control drive of the light source cell array portion is arranged.

6. The imaging apparatus according to claim 1, wherein the second substrate group includes:
a substrate on which the pixel array portion is arranged; and
a memory substrate which is stacked below the substrate and on which is arranged a memory cell array portion configured to output a convolution signal representing a result of a sum-of-product computation of an input signal based on the pixel signal.

7. The imaging apparatus according to claim 6, wherein at least one of the pixel signal and the convolution signal is an analog signal.

8. The imaging apparatus according to claim 7, further comprising a computing in memory (CIM) readout circuit configured to process the convolution signal read from the memory cell array portion.

9. The imaging apparatus according to claim 7, further comprising a pixel signal processing circuit configured to process the pixel signal read from the pixel array portion.

10. The imaging apparatus according to claim 9, wherein the pixel signal processing circuit is arranged on a same substrate as the pixel array portion.

11. The imaging apparatus according to claim 9, wherein the pixel signal processing circuit is arranged on a different substrate from the pixel array portion.

12. The imaging apparatus according to claim 1, wherein
the pixel array portion includes a photoelectric conversion portion configured to photoelectrically convert the light signal and a pixel transistor portion configured to subject the light signal to a sum-of-product computation, and
the photoelectric conversion portion is arranged on a different substrate from the pixel transistor portion.

13. The imaging apparatus according to claim 1, further comprising an optical modulation element arranged between the light source cell array portion and the pixel array portion.

14. The imaging apparatus according to claim 1, further comprising a shutter arranged between the light source cell array portion and the pixel array portion.

15. The imaging apparatus according to claim 1, further comprising a black mask provided on an edge of the first substrate group and an edge of the second substrate group.

16. The imaging apparatus according to claim 1, wherein the first substrate group and the second substrate group are housed in a light-shielding package.

17. The imaging apparatus according to claim 1, wherein the pixel array portion is configured to receive, in a direction opposite to the light signal, reflected light having been reflected by a subject.

18. An electronic device, comprising:
an imaging apparatus including:
a first substrate group in which is arranged a light source cell array portion configured to generate a light signal,
wherein the light signal is visible light; and
a second substrate group in which is arranged a pixel array portion configured to photoelectrically convert the light signal and output a pixel signal representing a result of a sum-of-product computation,
wherein the first substrate group and the second substrate group are stacked so that at least a part of the light source cell array portion overlaps with the pixel array portion, and
wherein the sum-of-product computation includes sums of products of the photoelectrically converted light signal and a corresponding coefficient for each pixel.

19. The electronic device according to claim 18, wherein
the light source cell array portion includes a plurality of light source cells arranged in a two-dimensional pattern,
the pixel array portion includes a plurality of pixels arranged in a two-dimensional pattern, and
in the plurality of light source cells and the plurality of pixels, a center pitch of one is an integral multiple of a center pitch of the other.

20. A signal processing method, comprising the steps of:
generating a light signal with a light source cell array portion arranged in a first substrate group,
wherein the light signal is visible light; and
photoelectrically converting the light signal and outputting a pixel signal representing a result of a sum-of-product computation with a pixel array portion which overlaps with at least a part of the light source cell array portion, and
wherein the sum-of-product computation includes sums of products of the photoelectrically converted light signal and a corresponding coefficient for each pixel.

* * * * *